United States Patent
Abe et al.

(10) Patent No.: US 9,712,394 B2
(45) Date of Patent: Jul. 18, 2017

(54) SENSOR NETWORK SYSTEM, SENSOR NETWORK CONTROL METHOD, SENSOR NODE, SENSOR NODE CONTROL METHOD, AND SENSOR NODE CONTROL PROGRAM

(75) Inventors: Kenichi Abe, Tokyo (JP); Yuichiro Ezure, Tokyo (JP); Hiroyuki Iizuka, Tokyo (JP); Toru Yamamoto, Tokyo (JP); Hidehiro Endou, Tokyo (JP)

(73) Assignee: NEC Corporation, Tokyo (JP)

( * ) Notice: Subject to any disclaimer, the term of this patent is extended or adjusted under 35 U.S.C. 154(b) by 770 days.

(21) Appl. No.: 14/233,539

(22) PCT Filed: Jun. 12, 2012

(86) PCT No.: PCT/JP2012/003805
§ 371 (c)(1),
(2), (4) Date: May 19, 2014

(87) PCT Pub. No.: WO2013/021534
PCT Pub. Date: Feb. 14, 2013

(65) Prior Publication Data
US 2014/0254433 A1 Sep. 11, 2014

(30) Foreign Application Priority Data

Aug. 5, 2011 (JP) .................................. 2011-171708

(51) Int. Cl.
*H04L 12/24* (2006.01)
*H04W 40/02* (2009.01)
(Continued)

(52) U.S. Cl.
CPC .............. *H04L 41/12* (2013.01); *H04L 45/48* (2013.01); *H04L 67/12* (2013.01); *H04W 4/006* (2013.01);
(Continued)

(58) Field of Classification Search
CPC ......... H04L 67/12; H04L 41/12; H04L 45/48; H04W 84/18; H04W 40/02; H04W 4/006; H04W 40/22
See application file for complete search history.

(56) References Cited

U.S. PATENT DOCUMENTS

| | | | |
|---|---|---|---|
| 8,559,306 B2* | 10/2013 | Gong .................... | H04L 1/0007 370/231 |
| 2010/0195560 A1* | 8/2010 | Nozaki ................ | H04B 7/2606 370/315 |
| 2012/0320923 A1* | 12/2012 | Vasseur ................ | H04W 40/22 370/400 |

FOREIGN PATENT DOCUMENTS

| | | |
|---|---|---|
| JP | 2007-020289 A | 1/2007 |
| JP | 2009-171497 A | 7/2009 |

(Continued)

OTHER PUBLICATIONS

Teshima, S. et al., "A Store-Carry-Forward-based Data Transfer Scheme Using Autonomous Clustering in VANET Environments," IEICE Technical Report, Japan, The Institute of Electronics, Information and Communication Engineers, vol. 110, No. 377, pp. 95-100 (Jan. 13, 2011).

(Continued)

Primary Examiner — Ian N Moore
Assistant Examiner — Brian T Le
(74) Attorney, Agent, or Firm — Wilmer Cutler Pickering Hale and Dorr LLP

(57) ABSTRACT

A sensor network system 1000 is provided with a plurality of sensor nodes 1100, ... and configured to decide a parent node for each of the plurality of sensor nodes so as to form a network topology having a tree structure using each of the plurality of sensor nodes as a node. The sensor network system forms the network topology so that, with respect to each of the plurality of sensor nodes, the number of child (Continued)

nodes owned by the sensor node is close to a value obtained by multiplying a maximum containing number, which is a maximum number of sensor data that can be contained by one packet, by a natural number (1200).

14 Claims, 12 Drawing Sheets

(51) Int. Cl.
      *H04W 4/00*       (2009.01)
      *H04L 29/08*       (2006.01)
      *H04W 40/22*       (2009.01)
      *H04L 12/753*       (2013.01)
      *H04W 84/18*       (2009.01)

(52) U.S. Cl.
      CPC ........... *H04W 40/02* (2013.01); *H04W 40/22* (2013.01); *H04W 84/18* (2013.01)

(56) References Cited

FOREIGN PATENT DOCUMENTS

| | | |
|---|---|---|
| JP | 2009-206560 A | 9/2009 |
| JP | 2010-166150 | 7/2010 |
| JP | 2011-509567 | 3/2011 |
| KR | 10-2010-0112135 | 10/2010 |
| WO | WO-2009/079650 | 6/2009 |

OTHER PUBLICATIONS

Japanese Office Action corresponding to Japanese Application No. 2011-171708, dated Nov. 17, 2015, 9 pages.
Naoyuki, Tsukamoto, et al., "A Study on Adaptive Control for an Integrated Packet in Sensor Networks", IECE Technical Report, Japan, The Institute of Electronics, Information and Communication Engineers, May 14, 2010, vol. 110, No. 50, pp. 21-24, USN2010-5, 9 pages.
Yusuke Kawai, et al., "Study on Data Aggregation in Wireless Sensor Network", Multimedia, Distributed, Cooperative, and Mobile Symposium, (DICOMO2011) Papers of Symposium, Series of Information Processing Society of Japan, Information Processing Society of Japan, Jul. 6, 2011, vol. 2011, No. 1, 9 pages.
International Search Report corresponding to PCT/JP2012/003805, dated Aug. 22, 2012, 5 pages.
Clausen, T. et al., "Optimized Link State Routing Protocol (OLSR)", IETF MANET RFC3626, 2003, pp. 1-67.
Johnson, D. et al., "The Dynamic Source Routing Protocol (DSR) for Mobile Ad Hoc Networks for IPv4", IETF MANET RFC4728, 2007, pp. 1-96.
Perkins, C. et al., "Ad hoc On-Demand Distance Vector (AODV) Routing", IETF MANET RFC3561, 2003, pp. 1-33.
Chinese Notification of First Office Action issued in corresponding Chinese Application No. 201280038593.X, dated Oct. 9, 2016, 10 pages.

* cited by examiner

101 = Sink Node
201...209 = Sensor Node

101 = Sink Node
201...214 = Sensor Node

SENSOR NETWORK SYSTEM, SENSOR NETWORK CONTROL METHOD, SENSOR NODE, SENSOR NODE CONTROL METHOD, AND SENSOR NODE CONTROL PROGRAM

CROSS-REFERENCE TO RELATED APPLICATIONS

This application is a national stage application of International Application No. PCT/JP2012/003805 entitled "Sensor Network System, Sensor Network Control Method, Sensor Node, Sensor Node Control Method, and Sensor Node Control Program," filed on Jun. 12, 2012, which claims the benefit of the priority of Japanese Patent Application No. 2011-171708, filed on Aug. 5, 2011, the disclosures of each of which are hereby incorporated by reference in their entirety.

TECHNICAL FIELD

The present invention relates to a sensor network system including a plurality of sensor nodes.

BACKGROUND ART

A sensor network system including a plurality of sensor nodes is known. Each of the sensor nodes detects a physical quantity (e.g., temperature, humidity, electricity consumption, or the like). Each of the sensor nodes transmits a packet containing sensor data representing the detected physical quantity to a specific node (a sink node) via the other sensor node. That is to say, the sensor nodes configure a wireless multihop network.

This type of sensor network system usually forms (constructs) a network topology having a tree structure using each of the sensor nodes as a node. A route node in the tree structure is the abovementioned sink node.

Such a network topology is usually constructed by using a routing protocol suitable for a wireless multihop network. As a routing protocol suitable for a wireless multihop network, a proactive routing protocol and a reactive routing protocol are known.

A typical example of a proactive routing protocol is the OLSR (Optimized Link State Routing) protocol. The OLSR protocol is a protocol defined by IETF (Internet Engineering Task Force) (see Non-Patent Document 1).

A typical example of a reactive routing protocol is the AODV (Ad hoc On-Demand Distance Vector) protocol, or the DSR (Dynamic Source Routing) protocol. The AODV protocol and the DSR protocol are protocols defined by IETF (see Non-Patent Document 2 and Non-Patent Document 3)

The routing protocol calculates a metric value representing cost (path cost) required for communication to a sink node, based on the intensity of radio signals received from another sensor node and/or a hop count from a sensor node to the sink node. Moreover, the routing protocol decides a parent node for each sensor node based on the calculated metric value, thereby constructing a network topology.

Further, as one of this type of sensor network systems, a sensor network system described in Patent Document 1 is configured to make the number of child nodes owned by each sensor node close to the average value.

Patent Document 1: Japanese Unexamined Patent Application Publication No. 2010-166150
Non-Patent Document 1: IETF MANET RFC3626: Optimized Link State Routing Protocol (OLSR)
Non-Patent Document 2: IETF MANET RFC3561: Ad hoc On-Demand Distance Vector (AODV) Routing
Non-Patent Document 3: IETF MANET RFC4728: The Dynamic Source Routing Protocol (DSR)

It is preferred that a sensor node is configured to, when receiving packets (pre-aggregation packets) containing sensor data from respective child nodes, generate a packet (a post-aggregation packet) containing the sensor data contained in each of the received packets and transmit the generated packet to a parent node. This enables reduction of the number of packets transmitted from the sensor node to the parent node.

On the other hand, the size of data that one packet can contain is previously determined. Therefore, in a case where the number of the child nodes owned by the sensor node is equal to a maximum containing number, which is the maximum number of sensor data that one packet can contain, the sensor node transmits one post-aggregation packet to the parent node. Moreover, for example, in a case where the number of the child nodes owned by the sensor node is 1 larger than the maximum containing number, the sensor node transmits two post-aggregation nodes to the parent node.

The abovementioned sensor network system constructs a network topology regardless of the maximum containing number. Therefore, there is a fear that the number of packets transmitted by the sensor node to the parent node becomes larger than necessary. That is to say, in the abovementioned sensor network system, communication load possibly becomes excessively large.

SUMMARY

Accordingly, an object of the present invention is to provide a sensor network system capable of solving the abovementioned problem, "communication load possibly becomes excessively large."

In order to achieve the object, a sensor network system according to an exemplary embodiment of the present invention is a system provided with a plurality of sensor nodes and configured to decide a parent node for each of the plurality of sensor nodes so as to form a network topology having a tree structure using each of the plurality of sensor nodes as a node.

Moreover, each sensor node of the plurality of sensor nodes includes:

a pre-aggregation packet generating means for detecting a physical quantity, generating a pre-aggregation packet that is a packet containing sensor data representing the detected physical quantity, and transmitting the generated pre-aggregation packet to a parent node of the sensor node;

a post-aggregation packet generating means for receiving pre-aggregation packets transmitted by respective child nodes owned by the sensor node, generating a post-aggregation packet that is a packet containing sensor data contained by the respective received pre-aggregation packets, and transmitting the generated post-aggregation packet to the parent node of the sensor node; and a post-aggregation packet transferring means for receiving the post-aggregation packet transmitted by each of the child nodes owned by the sensor node, and transmitting the received post-aggregation packet to the parent node of the sensor node.

Besides, the sensor network system includes a network topology forming means for forming the network topology so that, with respect to each sensor node of the plurality of sensor nodes, a number of child nodes owned by the sensor node is close to a value obtained by multiplying a maximum containing number by a natural number, the maximum containing number being a maximum number of sensor data that can be contained by one packet.

In this specification, a natural number is an integer equal to or more than 1.

Further, a sensor network control method according to another exemplary embodiment of the present invention is a method applied to a sensor network system provided with a plurality of sensor nodes and configured to decide a parent node for each of the plurality of sensor nodes so as to form a network topology having a tree structure using each of the plurality of sensor nodes as a node.

Moreover, the sensor network control method is a method including:

by each sensor node of the plurality of sensor nodes, detecting a physical quantity, generating a pre-aggregation packet that is a packet containing sensor data representing the detected physical quantity, and transmitting the generated pre-aggregation packet to a parent node of the sensor node;

by each sensor node of the plurality of sensor nodes, receiving pre-aggregation packets transmitted by respective child nodes owned by the sensor node, generating a post-aggregation packet that is a packet containing sensor data contained by the respective received pre-aggregation packets, and transmitting the generated post-aggregation packet to the parent node of the sensor node;

by each sensor node of the plurality of sensor nodes, receiving the post-aggregation packet transmitted by each of the child nodes owned by the sensor node, and transmitting the received post-aggregation packet to the parent node of the sensor node; and forming the network topology so that, with respect to each sensor node of the plurality of sensor nodes, a number of child nodes owned by the sensor node is close to a value obtained by multiplying a maximum containing number by a natural number, the maximum containing number being a maximum number of sensor data that can be contained by one packet.

Further, a sensor node according to another exemplary embodiment of the present invention is a sensor node forming a node in a network topology having a tree structure.

Moreover, the sensor node includes:

a pre-aggregation packet generating means for detecting a physical quantity, generating a pre-aggregation packet that is a packet containing sensor data representing the detected physical quantity, and transmitting the generated pre-aggregation packet to a parent node;

a post-aggregation packet generating means for receiving pre-aggregation packets transmitted by respective child nodes, generating a post-aggregation packet that is a packet containing sensor data contained by the respective received pre-aggregation packets, and transmitting the generated post-aggregation packet to the parent node;

a post-aggregation packet transferring means for receiving the post-aggregation packet transmitted by each of the child nodes, and transmitting the received post-aggregation packet to the parent node; and a parent node deciding means for: specifying parent node candidates that are other sensor nodes capable of communicating with the sensor node; with respect to each parent node candidate of the specified parent node candidates, calculating a metric value for making a number of child nodes owned by the parent node candidate close to a value obtained by multiplying a maximum containing number by a natural number, the maximum containing number being a maximum number of sensor data that can be contained by one packet; and deciding a parent node of the sensor node based on the calculated metric value from among the specified parent node candidates.

Further, a sensor node control method according to another exemplary embodiment of the present invention is a method applied to a sensor node forming a node in a network topology having a tree structure.

Moreover, the sensor node control method is a method including:

detecting a physical quantity, generating a pre-aggregation packet that is a packet containing sensor data representing the detected physical quantity, and transmitting the generated pre-aggregation packet to a parent node;

receiving pre-aggregation packets transmitted by respective child nodes, generating a post-aggregation packet that is a packet containing sensor data contained by the respective received pre-aggregation packets, and transmitting the generated post-aggregation packet to the parent node;

receiving the post-aggregation packet transmitted by each of the child nodes, and transmitting the received post-aggregation packet to the parent node; and specifying parent node candidates that are other sensor nodes capable of communicating with the sensor node; with respect to each parent node candidate of the specified parent node candidates, calculating a metric value for making a number of child nodes owned by the parent node candidate close to a value obtained by multiplying a maximum containing number by a natural number, the maximum containing number being a maximum number of sensor data that can be contained by one packet; and deciding a parent node of the sensor node based on the calculated metric value from among the specified parent node candidates.

Further, a sensor node control program according to another exemplary embodiment of the present invention is a program including instructions for causing a sensor node forming a node in a network topology having a tree structure to perform operations including:

detecting a physical quantity, generating a pre-aggregation packet that is a packet containing sensor data representing the detected physical quantity, and transmitting the generated pre-aggregation packet to a parent node;

receiving pre-aggregation packets transmitted by respective child nodes, generating a post-aggregation packet that is a packet containing sensor data contained by the respective received pre-aggregation packets, and transmitting the generated post-aggregation packet to the parent node;

receiving the post-aggregation packet transmitted by each of the child nodes, and transmitting the received post-aggregation packet to the parent node; and specifying parent node candidates that are other sensor nodes capable of communicating with the sensor node; with respect to each parent node candidate of the specified parent node candidates, calculating a metric value for making a number of child nodes owned by the parent node candidate close to a value obtained by multiplying a maximum containing number by a natural number, the maximum containing number being a maximum number of sensor data that can be contained by one packet; and deciding a parent node of the sensor node based on the calculated metric value from among the specified parent node candidates.

With the configurations as described above, the present invention enables reduction of communication load.

EXEMPLARY EMBODIMENTS

Referring to FIGS. 1 to 13, exemplary embodiments of a sensor network system, a sensor network control method, a sensor node, a sensor node control method and a sensor node control program according to the present invention will be described below, respectively.

First Exemplary Embodiment (Configuration)

Figure 1:
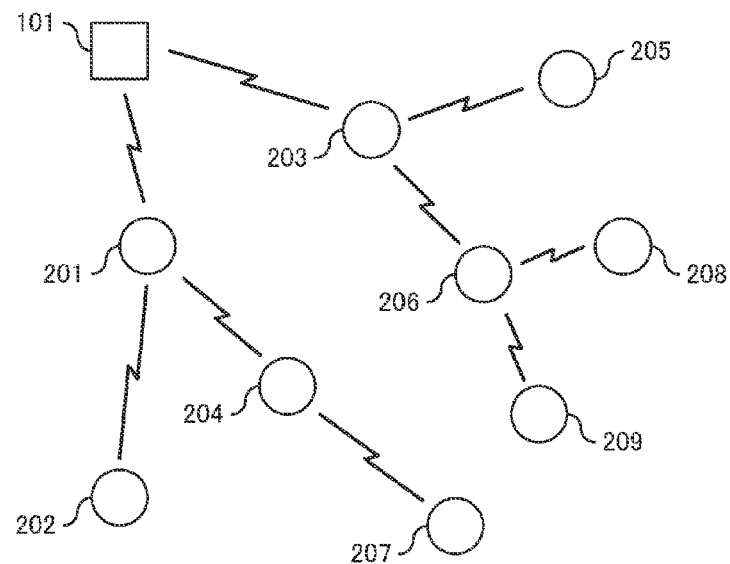
FIG. 1 is a diagram showing a schematic configuration of a sensor network system according to a first exemplary embodiment of the present invention.

A sensor network system 1 according to a first exemplary embodiment includes one sink node 101 and a plurality of sensor nodes 201, 202 . . . as shown in FIG. 1.

The sensor nodes 201, 202 . . . are placed in positions different from each other. Each of the sensor nodes 201, 202 . . . is configured to perform wireless communication with the other sensor nodes 201, 202 . . . .

Each of the sensor nodes 201, 202 . . . detects a physical quantity, and acquires sensor data representing the detected physical quantity. Each of the sensor nodes 201, 202 . . . transmits a packet containing the acquired sensor data to the sink node 101 via the other sensor nodes 201, 202 . . . .

The sink node 101 collects the sensor data by receiving the packet transmitted by each of the sensor nodes 201, 202 . . . .

Moreover, the sensor network system 1 decides a parent node for each of the sensor nodes 201, 202 . . . so as to form a network topology having a tree structure in which the sink node 101 and the sensor nodes 201, 202 . . . are used as nodes, respectively. The sink node 101 configures a root node.

Besides, the sensor nodes 201, 202 . . . each transmit packets containing sensor data to the sensor nodes 201, 202 . . . decided as the parent nodes for the nodes themselves.

Figure 2:
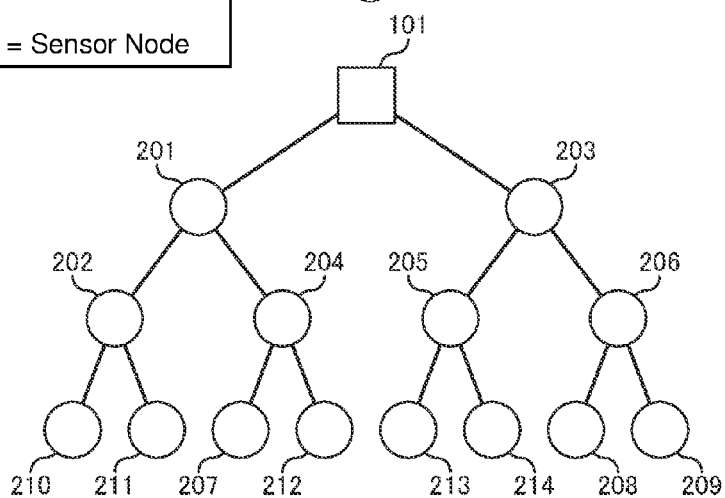
FIG. 2 is a diagram showing an example of a network topology formed in the sensor network system according to the first exemplary embodiment of the present invention.

FIG. 2 is a diagram showing an example of a network topology formed by the sensor network system 1. In FIG. 2, a straight line connecting two nodes represents that the two nodes are in a parent child relation. That is to say, of the two nodes connected by the straight line, one positioned on the root-node side has the other as a child node. In other words, of the two nodes connected by the straight line, the node positioned on the root-node side is a parent node of the other node.

Figure 3:
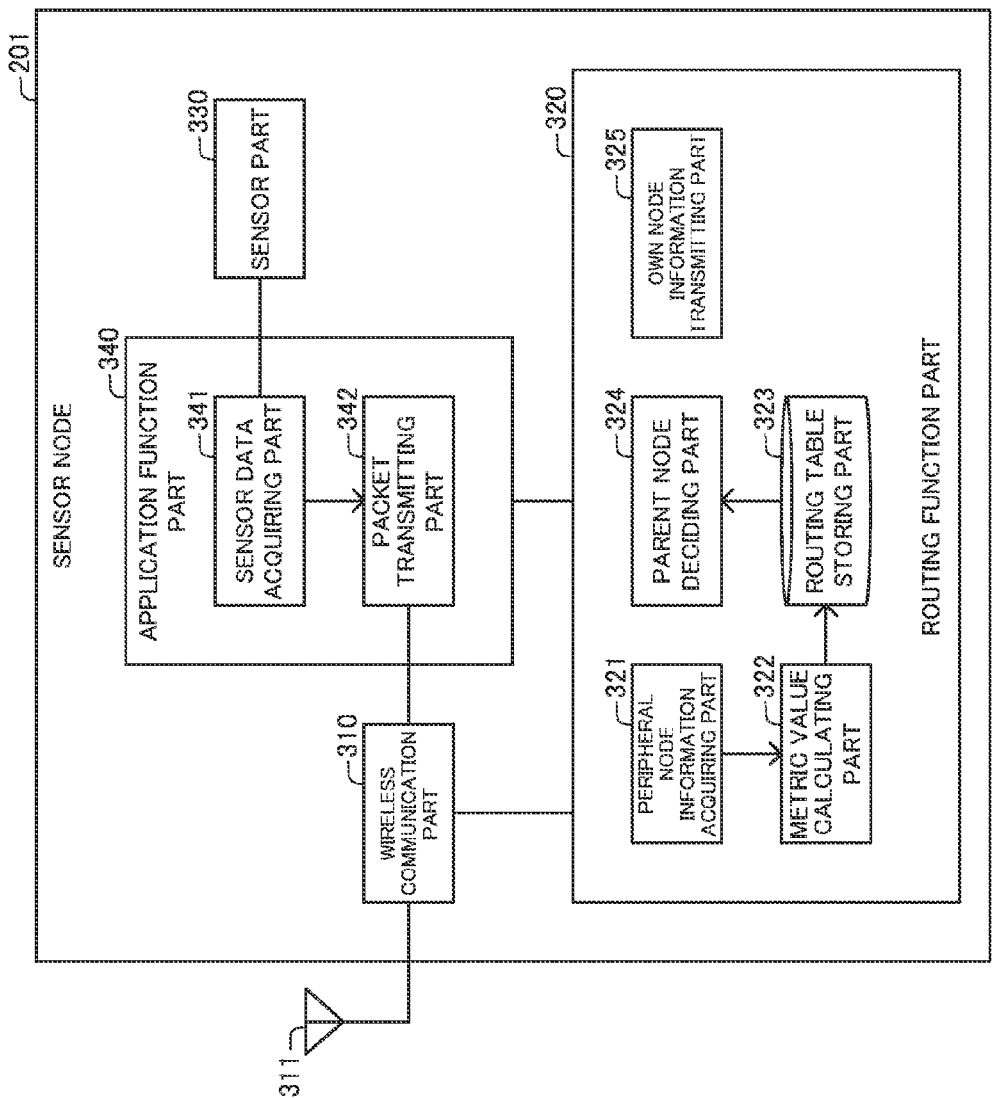
FIG. 3 is a block diagram showing the configuration of a sensor node according to the first exemplary embodiment of the present invention.

As shown in FIG. 3, the sensor node 201 includes a wireless communication part 310, a routing function part 320, a sensor part 330, and an application function part 340.

The wireless communication part 310 has an antenna 311 for transmitting and receiving radio signals. The wireless communication part 310 performs wireless communication with the other nodes (the sink node 101, and the sensor nodes 202 . . . ) via the antenna 311.

In this exemplary embodiment, the wireless communication part 310 performs wireless communication according to a standard determined by IEEE (Institute of Electrical and Electronics Engineers) 802.11. The wireless communication part 310 may be configured to perform wireless communication according to another standard (e.g., a standard determined by IEEE802.15.1, a standard determined by IEEE802.15.4, Bluetooth™, ZigBee™, or the like).

The routing function part 320 includes a peripheral node information acquiring part 321, a metric value calculating part 322, a routing table storing part 323, a parent node deciding part 324, and an own node information transmitting part 325.

The peripheral node information acquiring part 321 acquires peripheral node information with respect to each of peripheral nodes. A peripheral node is a parent node candidate, which is a node capable of performing wireless communication with the own node (the sensor node 201) among the other nodes (the sink node 101 and the sensor nodes 202 . . . ).

Peripheral node information includes first portion information and second portion information. The first portion information is information transmitted by a peripheral node. The first portion information includes node identification information for identifying the peripheral node, hop count information representing a hop count from the peripheral node to the sink node 101, and child node number information representing a child node number, which is the number of child nodes owned by the peripheral node.

The second portion information is information representing reception intensity, which is the intensity of a radio signal received from the peripheral node. The peripheral node information acquiring part 321 acquires the intensity of a radio signal received when receiving the first portion information, and acquires information representing the acquired intensity as the second portion information.

Acquiring peripheral node information by the peripheral node information acquiring part 321 corresponds to specifying the own node (the sensor node 201) as a processing target node and extracting (specifying) a parent node candidate (a peripheral node) that is a sensor node capable of performing communication with the specified processing target node.

With respect to each of peripheral node information acquired by the peripheral node information acquiring part 321, the metric value calculating part 322 calculates a metric value based on the peripheral node information. A metric value is a value representing path cost, which is cost required for communication to the sink node 101. In this exemplary embodiment, the smaller a metric value is, the smaller path cost is.

In this exemplary embodiment, based on reception intensity e (i.e., the intensity of a radio signal received from a parent node candidate) and a hop count h (i.e., a hop count from the parent node candidate to the root node) that are included in peripheral node information to be the target of calculation of a metric value M, and based on a tentative child node number n obtained by adding 1 to a child node number included in the peripheral node information, the metric value calculating part 322 calculates the metric value M by Formula 1.

$$M = M_{eh}(e,h) + \alpha \cdot M_n(n) \quad \text{[Formula 1]}$$

In the above formula, a first portion metric value $M_{eh}(e,h)$ is a function having a value changing depending on the reception intensity e and the hop count h. A second portion metric value $M_n(n)$ is a function having a value changing depending on the tentative child node number n. Symbol α denotes a preset coefficient.

Accordingly, in this exemplary embodiment, it can be said that the metric value M is a value changing depending on both the intensity e of a radio signal received from a parent node candidate and the hop count h from the parent node candidate to the root node in the tree structure and depending on the number of child nodes owned by the parent node candidate.

Further, in this exemplary embodiment, it can be said that the metric value calculating part 322 calculates, as a metric value, the linear sum of a first portion metric value based on reception intensity and a hop count that are included in peripheral node information and a second portion metric value based on a child node number included in the peripheral node information.

The metric value calculating part 322 may be configured to calculate the second portion metric value as a metric value. Moreover, the metric value calculating part 322 may be configured to calculate the first portion metric value based on either the reception intensity e or the hop count h. Moreover, the metric value calculating part 322 may be configured to calculate the first portion metric value based on also a parameter, such as a delay time and a packet error ratio, other than the reception intensity e and the hop count h.

The first portion metric value $M_{eh}(e,h)$ is the same function as a function used in a publicly known routing protocol. Therefore, a detailed description thereof will be omitted.

Further, according to Formula 1, by changing the magnitude of the coefficient α, it is possible to regulate the degree of reflection of the magnitude of the child node number on the metric value M. As the coefficient α is made to be close to 0, the degree of reflection by the magnitude of the child node number on the metric value M becomes smaller.

In this exemplary embodiment, the second portion metric value $M_n(n)$ is expressed by Formula 2.

$$M_n = \frac{1}{N}\{N - \text{MOD}(n-1, N)\} \quad \text{[Formula 2]}$$

In the above formula, N denotes a maximum containing number, which is the maximum number of sensor data that one packet can contain, and MOD(X,Y) is a function having the remainder of a division of dividing an integer X by an integer Y, as a value. According to Formula 2, it is found that the second portion metric value $M_n(n)$ has a value from 0 to 1.

Further, the maximum containing number N is calculated from Formula 3.

$$N = \text{QUOTIENT}\{(P_{max} - P_{header}), P_{data}\} \quad \text{[Formula 3]}$$

In the above formula, $P_{max}$ denotes a maximum packet length, which is the maximum size (data amount) of one packet, $P_{header}$ denotes a header length, which is the size of a header included in one packet, and $P_{data}$ denotes the size (sensor data size) of one sensor data.

In this exemplary embodiment, the metric value calculating part 322 previously stores the maximum packet length $P_{max}$, the header length $P_{header}$, and the sensor data size $P_{data}$. The metric value calculating part 322 may be configured to acquire the sensor data size $P_{data}$ based on acquired sensor data. In this case, it is preferred that the metric value calculating part 322 is configured to, when acquiring a plurality of different sensor data sizes, acquire the maximum value of the acquired sensor data sizes as the sensor data size $P_{data}$.

Further, QUOTIENT(X,Y) is a function having the quotient of a division of dividing an integer X by an integer Y, as a value. The maximum packet length is previously determined according to the standard of wireless communication. Moreover, the header length is previously determined according to the standard of wireless communication and the format of a packet used by the sensor network system 1.

For example, given that the maximum packet length is 127 Byte, the header length is 20 Byte and the size of sensor data is 10 Byte, the maximum containing number N is 10.

Figure 4:
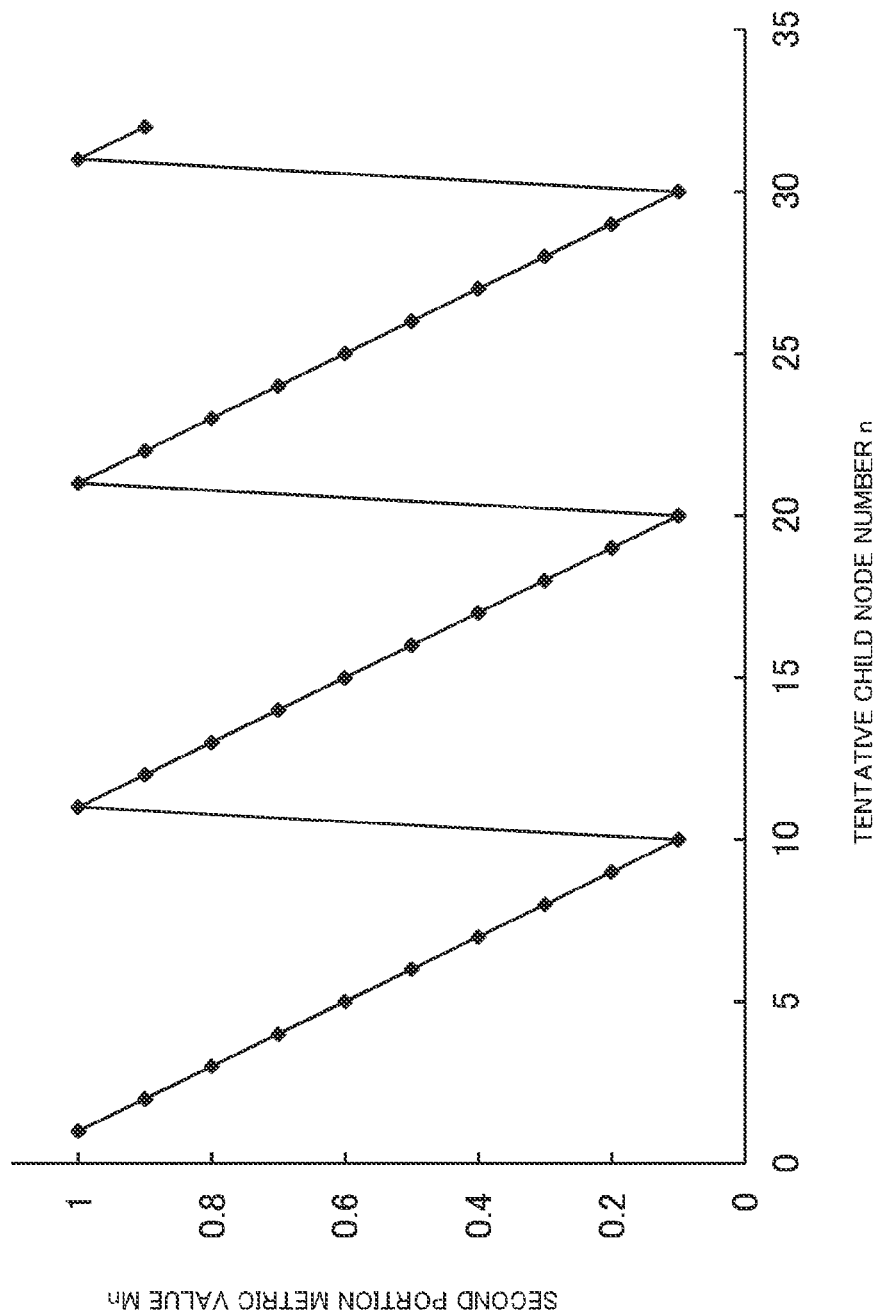
FIG. 4 is a graph showing change of a second portion metric value with respect to a tentative child node number according to the first exemplary embodiment of the present invention.

FIG. 4 is a graph showing change of the second portion metric value $M_n(n)$ with respect to the tentative child node number n. A case where the maximum containing number N is 10 is assumed.

As shown in FIG. 4, the second portion metric value $M_n(n)$ decreases as the tentative child node number n increases in a range from a value obtained by adding 1 to a value obtained by multiplying a value obtained by subtracting 1 from a natural number by the maximum containing number N, to a value as a result of multiplying the natural number by the maximum containing number N. In this specification, a natural number is an integer equal to or more than 1.

For example, the second portion metric value $M_n(n)$ decreases as the tentative child node number n increases in a range from 1 to 10. Likewise, the second portion metric value $M_n(n)$ decreases as the tentative child node number n increases in a range from 11 to 20.

Thus, because a case where the maximum containing number N is 10 is assumed, the second portion metric value $M_n(n)$ becomes the minimum when the tentative child node number n is 10, 20 or 30, which is a value obtained by multiplying the maximum containing number N by a natural number.

That is to say, in this exemplary embodiment, the sensor network system 1 is configured so that the metric value M decreases as the tentative child node number n increases in a range from a value obtained by adding 1 to a value obtained by multiplying a value obtained by subtracting 1 from a natural number by the maximum containing number N, to a value obtained by multiplying the natural number by the maximum containing number N.

Thus, it can be said that the metric value M is a value for making the number of child nodes owned by a parent node candidate close to a value obtained by multiplying a maximum containing number by a natural number.

The routing table storing part 323 is configured by a storage device. The routing table storing part 323 stores a routing table in which peripheral node information acquired by the peripheral node information acquiring part 321, a metric value calculated by the metric value calculating part 322 based on the peripheral node information, and parent child relation information are associated.

Parent child relation information includes information representing whether a node identified by node identification information (included in peripheral node information) stored in association with the parent child relation information is a parent node of the own node or not, and information representing whether the abovementioned node is a child node for the own node.

The parent node deciding part 324 determines a node identified by node identification information of the minimum metric value from among node identification information stored by the routing table storing part 323, as a parent node of the own node. Thus, the peripheral node information acquiring part 321, the metric value calculating part 322, the routing table storing part 323, and the parent node deciding part 324 configure a parent node deciding means.

When a parent node is decided by the parent node deciding part 324, the routing table storing part 323 updates parent child relation information stored in association with node identification information for identifying the parent node, to information representing that the node is a parent node.

When a parent node is decided by the parent node deciding part 324, the own node information transmitting part 325 transmits parent node decision notice including node identification information for identifying the own node, to the parent node.

The own node information transmitting part 325 receives parent node decision notice from the other node. When receiving parent node decision notice, the own node information transmitting part 325 updates parent child relation information stored in the routing table storing part 323 in association with node identification information included in the parent node decision notice, to information representing that the node is a child node.

The own node information transmitting part 325 transmits own node information (first portion information) to each of the peripheral nodes. Own node information includes node identification information for identifying the own node, a hop count from the own node to the sink node 101, and a child node number, which is the number of child nodes owned by the own node.

The own node information transmitting part 325 acquires a value obtained by adding 1 to a hop count included in peripheral node information including node identification information for identifying the parent node determined by the parent node deciding part 324, as a hop count (for the own node) from the own node (herein, the sensor node 201) to the sink node 101.

The own node information transmitting part 325 acquires the number of node identification information stored in association with parent child relation information representing that a node is a child node from among the node identification information stored by the routing table storing part 323, as the number of child nodes owned by the own node. In a case where the own node information transmitting part 325 establishes a session with a child node, the own node information transmitting part 325 may be configured to acquire the number of child nodes based on the number of established sessions.

The sensor part 330 detects a physical quantity (in this exemplary embodiment, temperature). The sensor part 330 may be configured to detect humidity, electricity consumption (the amount of electricity consumed per unit time), the use amount of gas, the use amount of water, speech, or the like, as a physical quantity.

The application function part 340 includes a sensor data acquiring part 341 and a packet transmitting part 342.

The sensor data acquiring part 341 acquires sensor data representing a physical quantity detected by the sensor part 330 every time a preset acquisition period passes. In this exemplary embodiment, sensor data is data representing a detected physical quantity itself. The sensor data acquiring part 341 may be configured to acquire sensor data representing a value (e.g., the average value, variance, and the like) based on physical quantities detected by the sensor part 330 during a preset period.

When sensor data is acquired by the sensor data acquiring part 341, the packet transmitting part 342 generates a pre-aggregation packet, which is a packet containing the sensor data. The packet transmitting part 342 transmits the generated pre-aggregation packet to a parent node of the own node. Thus, the sensor part 330 and the packet transmitting part 342 configure a pre-aggregation packet generating means.

The packet transmitting part 342 receives a pre-aggregation packet transmitted by each of child nodes owned by the own node. Upon receiving the pre-aggregation packets, the packet transmitting part 342 generates a post-aggregation packet, which is a packet containing sensor data contained by each of the received pre-aggregation packets. The packet transmitting part 342 transmits the generated post-aggregation packet to the parent node of the own node. Thus, the packet transmitting part 342 configures a post-aggregation packet generating means.

The packet transmitting part 342 receives a post-aggregation packet transmitted by each of the child nodes owned by the own node. Upon receiving the post-aggregation packets, the packet transmitting part 342 transmits the received post-aggregation packets to the parent node of the own node. Thus, the packet transmitting part 342 configures a post-aggregation packet transferring means.

Each of the other sensor nodes 202, 203 . . . also has the same configuration as the sensor node 101.

With such a configuration, it can be said that the sensor network system 1 is equipped with a network topology forming means for forming a network topology so as to, with respect to each of a plurality of nodes including the sensor nodes 201, 202 . . . and the sink node 101, make the number of child nodes owned by the node close to a value obtained by multiplying the maximum containing number by a natural number.

For each of the sensor nodes 201, 202 . . . to include the parent node deciding means corresponds to that the sensor network system 1 includes the network topology forming means. Moreover, for each of the sensor nodes 201, 202 . . . to include the routing table storing part 323 corresponds to that the sensor network system 1 includes a topology information storing means for storing topology information representing a network topology.

Figure 5:
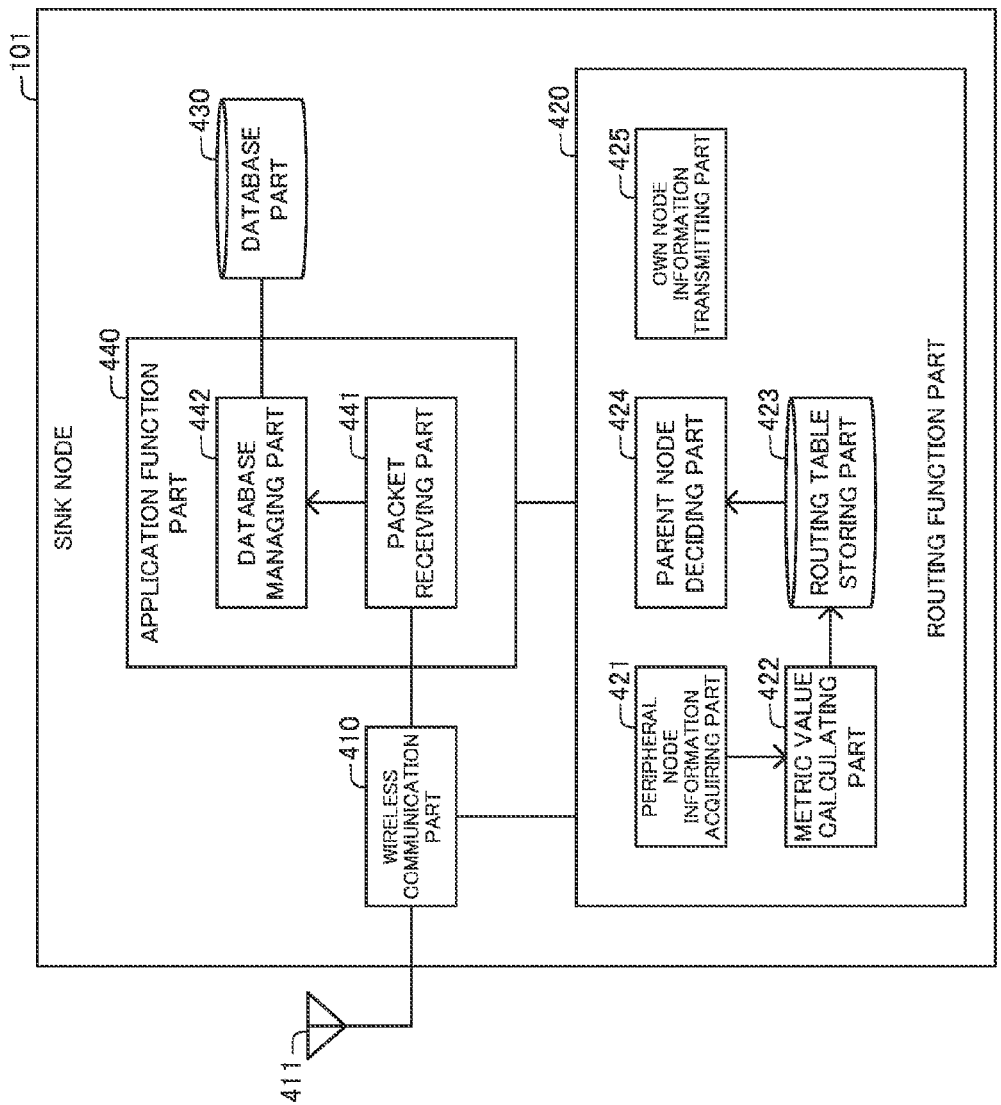
FIG. 5 is a block diagram showing the configuration of a sink node according to the first exemplary embodiment of the present invention.

As shown in FIG. 5, the sink node 101 includes a wireless communication part 410, a routing function part 420, a database part 430, and an application function part 440.

The wireless communication part 410 has the same configuration as the wireless communication part 310.

The routing function part 420 has the same configuration as the routing function part 320.

The database part 430 is configured by a storage device. The database part 430 stores (i.e., accumulates) sensor data and node identification information in association with each other.

The application function part 440 includes a packet receiving part 441 and a database managing part 442.

The packet receiving part 441 receives a packet (a pre-aggregation packet and a post-aggregation packet) transmitted by each of child nodes. The packet receiving part 441 acquires sensor data included in the received packet, and node identification information for identifying a node having transmitted the packet.

The database managing part 442 stores (writes) the sensor data and node identification information acquired by the packet receiving part 441 into the database part 430

The sink node 101 is configured to store acquired sensor data into the storage device of the node itself, but may be configured to transmit the sensor data to another device (e.g., a server or the like).

Further, the sink node 101 may have the same function as the sensor part 330 and the same function as the application function part 340 to be configured to acquire sensor data in the node itself.

(Operation)

Figure 6:
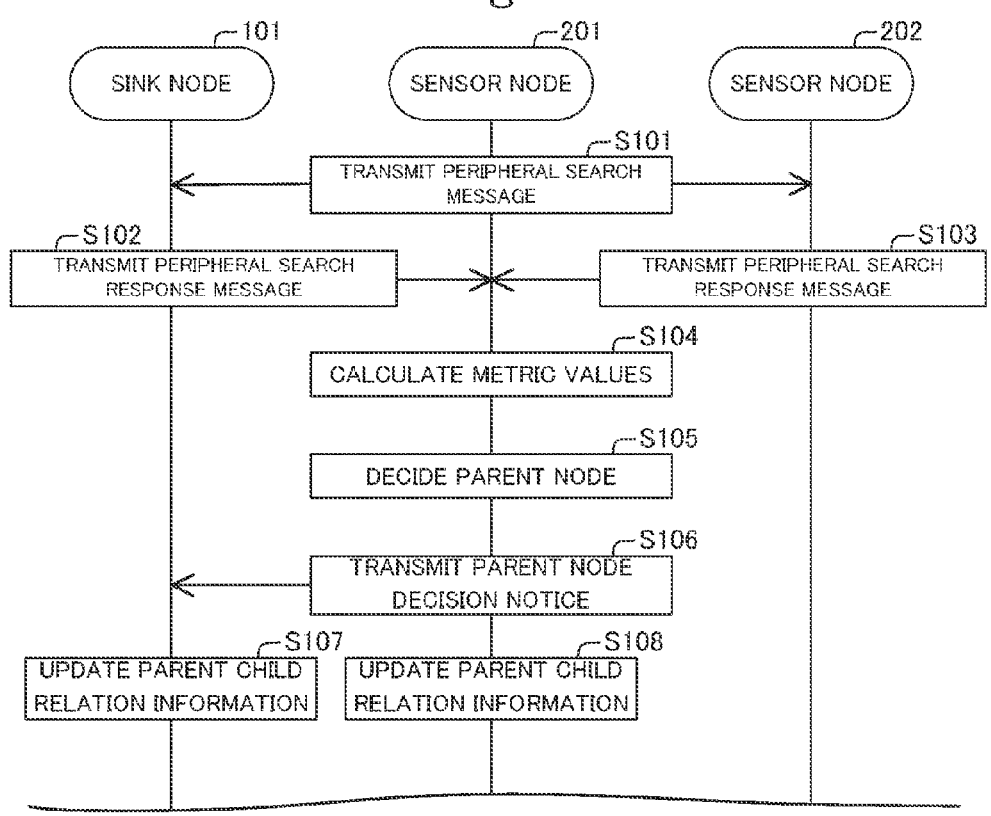
FIG. 6 is a sequence diagram showing an operation when a sensor node decides a parent node among operations of the sensor network system according to the first exemplary embodiment of the present invention.

Next, referring to FIG. 6, an operation when the sensor node 201 decides a parent node among operations of the abovementioned sensor network system 1 will be described.

The sensor node 201 transmits a peripheral search message by the broadcasting scheme every time a preset updating period passes (step S101). The broadcasting scheme is a scheme of setting a broadcast address as a destination address included in a message, thereby setting all nodes as destinations.

Therefore, a peripheral search message is transmitted to each of nodes (in this exemplary embodiment, the sink node 101, the sensor nodes 202, etc.) capable of communicating with the sensor node 201. Herein, a peripheral search message includes own node information of the sensor node 201. Own node information includes node identification information for identifying the node itself, a hop count from the node itself to the sink node 101, and the number of child nodes owned by the node itself (a child node number).

On the other hand, upon receiving the peripheral search message transmitted by the sensor node 201, the sink node 101 transmits a peripheral search response message for responding to the peripheral search message by the unicast scheme, to the node (the sensor node 201) having transmitted the peripheral search message (step S102).

The unicast scheme is a scheme of setting the address of a specific node as a destination address included in a message, thereby setting the node as a destination. The peripheral search response message includes own node information of the sink node 101.

Likewise, upon receiving a peripheral search message transmitted by the sensor node 201, the sensor node 202 transmits a peripheral search response message for responding to the peripheral search message by the unicast scheme, to the node (the sensor node 201) having transmitted the peripheral search message (step S103). The peripheral search response message includes own node information of the sensor node 202.

Thus, the sensor node 201 receives peripheral search response messages from the sink node 101 and the sensor nodes 202, etc., that are peripheral nodes (parent node candidates). Moreover, the sensor node 201 acquires peripheral node information with respect to each of the peripheral nodes (the sink node 101 and the sensor nodes 202, etc.).

Accordingly, the sensor node 201 can acquire peripheral node information with respect to each of peripheral nodes capable of communicating with the node itself by transmitting a peripheral search message and receiving a peripheral search response message.

Next, the sensor node 201 calculates a metric value based on the acquired peripheral node information with respect to each of the peripheral nodes (step S104). The sensor node 201 stores the peripheral node information and the metric values into the storage device. Then, the sensor node 201 determines a peripheral node that the calculated metric value is the minimum (herein, the sink node 101), as a parent node (step S105).

Then, the sensor node 201 transmits parent node decision notice including the node identification information for identifying the node itself, to the decided parent node (the sink node 101) (step S106).

On the other hand, upon receiving the parent node decision notice transmitted by the sensor node 201, the sink node 101 updates parent child relation information stored in association with the node identification information (herein, the node identification information for identifying the sensor node 201) included in the parent node decision notice, to information representing that the node is a child node (step S107).

Further, the sensor node 201 updates parent child relation information stored in association with the node identification information for identifying the parent node (the sink node 101), to information representing that the node is a parent node (step S108).

The sensor network system 1 repeatedly executes this process on each of the sensor nodes 201, 202 . . . . Thus, the sensor network system 1 forms a network topology so as to, with respect to each of the plurality of nodes including the sensor nodes 201, 202 . . . and the sink node 101, make the number of child nodes owned by the node close to a value obtained by multiplying the maximum containing number by a natural number.

Assuming a case where a network topology is formed as shown in FIG. 2, each of the sensor nodes 201, 202 . . . acquires sensor data representing a detected physical quantity every time the abovementioned acquisition period passes. Then, each of the sensor nodes 201, 202 . . . generates a pre-aggregation packet containing the acquired sensor data. Next, the sensor nodes 201, 202 . . . transmit the generated pre-aggregation packets to parent nodes, respectively.

To be more specific, the sensor nodes 201 and the sensor node 203 each transmit the pre-aggregation packets to the sink node 101.

The sensor node 202 and the sensor node 204 each transmit the pre-aggregation packets to the sensor node 201. The sensor node 201 receives the pre-aggregation packets from the respective sensor nodes 202 and 204. Then, the sensor node 201 generates a post-aggregation packet containing the sensor data contained in the respective received pre-aggregation packets. Next, the sensor node 201 transmits the generated post-aggregation packet to the sink node 101.

Further, the sensor node 210 and the sensor node 211 each transmit the pre-aggregation packets to the sensor node 202. The sensor node 202 receives the pre-aggregation packets from the respective sensor nodes 210 and 211. Then, the sensor node 202 generates a post-aggregation packet containing the sensor data contained in the respective received pre-aggregation packets. Next, the sensor node 202 transmits the generated post-aggregation packet to the sensor node 201. Then, the sensor node 201 receives the post-aggregation packet transmitted by the sensor node 202, and transfers (transmits) the received post-aggregation packet to the sink node 101.

Likewise, the sensor node 207 and the sensor node 212 each transmit the pre-aggregation packets to the sensor node 204. The sensor node 204 receives the pre-aggregation packets from the respective sensor nodes 207 and 212. Then, the sensor node 204 generates a post-aggregation packet containing the sensor data contained in the respective received pre-aggregation packets. Next, the sensor node 204 transmits the generated post-aggregation packet to the sensor node 201. Then, the sensor node 201 receives the post-aggregation packet transmitted by the sensor node 204, and transfers (transmits) the received post-aggregation packet to the sink node 101.

Also, the pre-aggregation packets transmitted by the respective sensor nodes 205, 206, 208, 209, 213 and 214 are processed in the abovementioned manner.

For example, assuming a case where the sensor node 201 has 10 child nodes and the maximum containing number is 10, the sensor node 201 receives 10 pre-aggregation packets. Then, the sensor node 201 generates a post-aggregation packet containing 10 sensor data contained in the received 10 pre-aggregation packets.

Further, assuming a case where the sensor node 201 has 19 child nodes and the maximum containing number is 10, the sensor node 201 receives 19 pre-aggregation packets. Then, the sensor node 201 generates a first post-aggregation packet containing 10 sensor data contained in 10 pre-aggregation packets of the received 19 pre-aggregation packets, and a second post-aggregation packet containing 9 sensor data contained in the remaining (9) pre-aggregation packets.

A description will be made by comparing a network topology formed based on calculation by simulating the sensor network system 1 (a first sensor network system) according to the first exemplary embodiment, and a network topology formed based on calculation by simulating a sensor network system (a second sensor network system) calculating a metric value not based on the number of child nodes.

Figure 7:
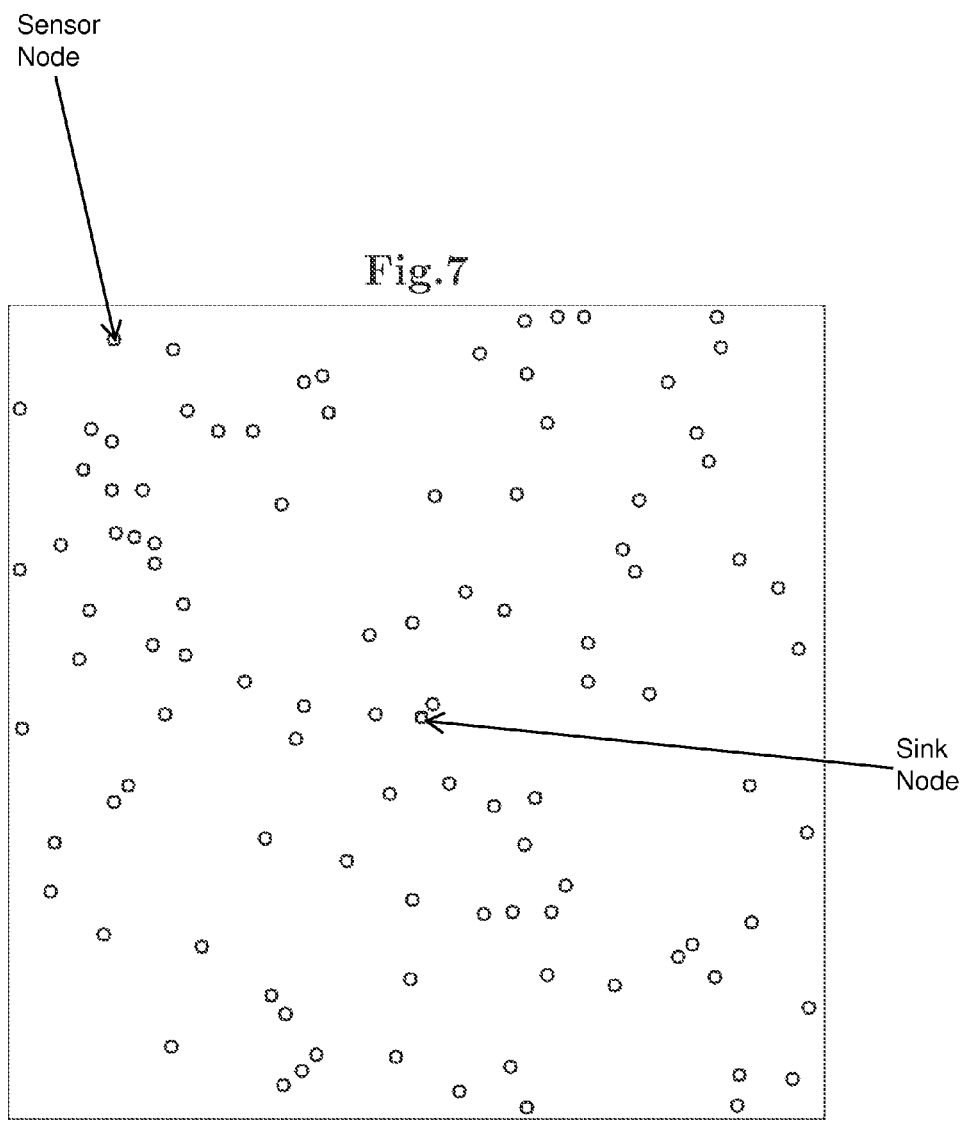
FIG. 7 is a diagram showing the positions of nodes placed in a sensor network system in simulation.

First, a sensor network system assumed in simulation will be described. In this sensor network system, nodes are placed as shown in FIG. 7. A square mark placed at the center represents a sink node. A circle mark represents a sensor node. A region in which the nodes are placed is a square region of 400 m by 400 m, and 100 sensor nodes are placed. It is assumed that in a case where a distance between two nodes is equal to or less than 80 m, the two nodes can communicate with each other.

Figure 8:
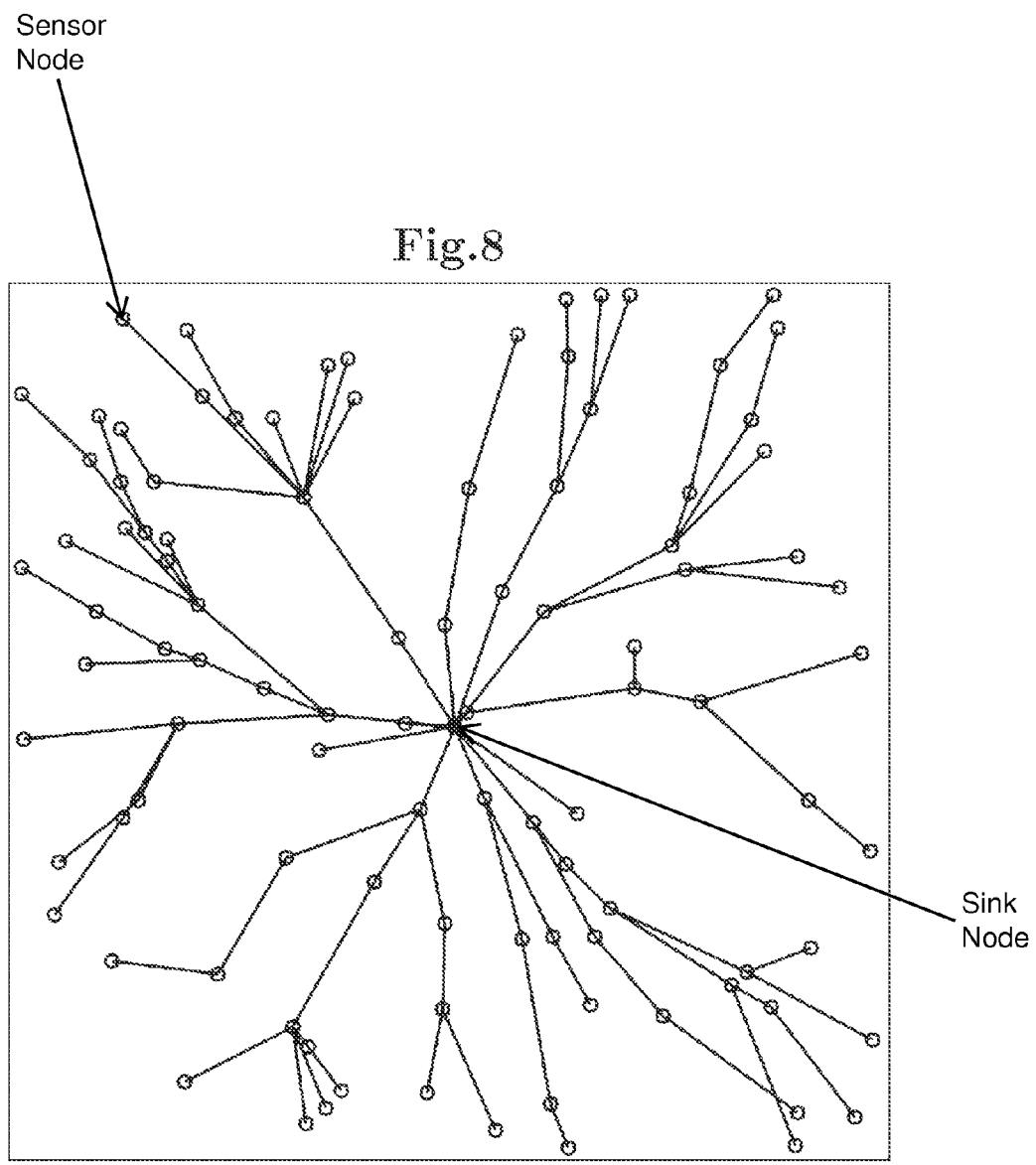
FIG. 8 is a diagram showing a network topology formed based on calculation by simulating a second sensor network system.

FIG. 8 shows the network topology formed based on calculation by simulating the second sensor network system. In this example, the second sensor network system sets the coefficient α in Formula 1 to 0. In FIG. 8, a straight line connecting two nodes represents that a node closer to the sink node among the two nodes is a parent node of the other node among the two nodes.

In this example, the number of nodes having only one child node is relatively large. Therefore, there is a relatively high possibility that the number of packets transmitted by the sensor nodes to the parent nodes becomes uselessly large.

Figure 9:
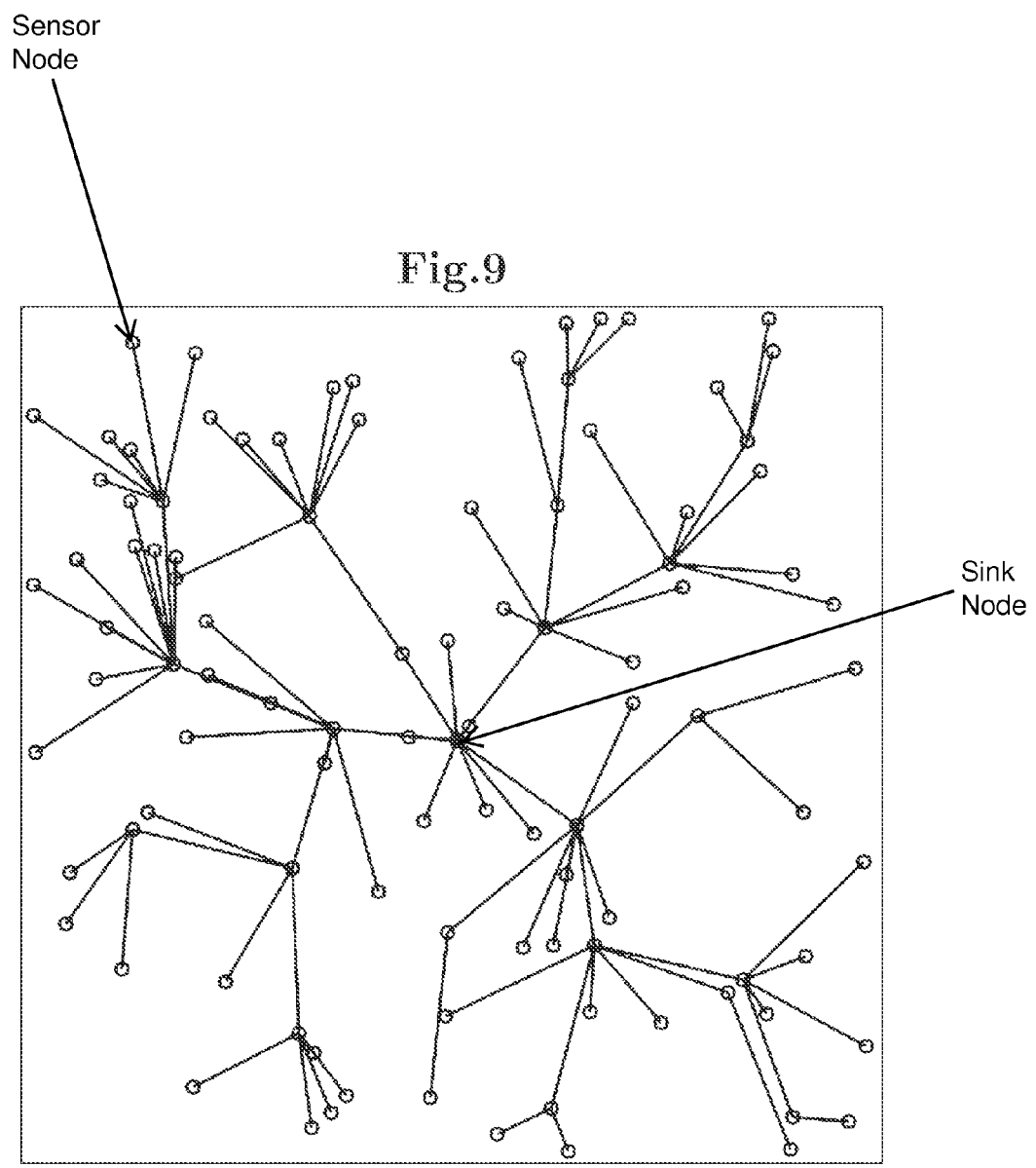
FIG. 9 is a diagram showing a network topology formed based on calculation by simulating a first sensor network system.

FIG. 9 shows the network topology formed based on calculation by simulating the first sensor network system. In this example, the first sensor network system sets the coefficient α in Formula 1 to a value larger than 0. Also in FIG. 9, a straight line connecting two nodes represents that a node closer to the sink node among the two nodes is a parent node of the other node among the two nodes.

In this example, the number of nodes having only one child node is relatively small. That is to say, the number of child nodes owned by each of the nodes is made to be close to a value obtained by multiplying the maximum containing number by a natural number. Therefore, it is possible to make the number of sensor data contained in a post-aggregation packet close to the maximum containing number. Consequently, it is possible to reduce communication load.

As described above, the sensor network system 1 according to the first exemplary embodiment of the present invention forms a network topology so as to, with respect to each of the sensor nodes 201, 202 . . . , make the number of child nodes owned by the sensor node close to a value obtained by multiplying the maximum containing number by a natural number.

According to this, it is possible to make the number of sensor data contained in a post-aggregation packet close to the maximum containing number. Consequently, in the sensor network system 1, the number of post-aggregation packets transmitted by the sensor nodes 201, 202 . . . to the parent nodes can be reduced. Therefore, it is possible to reduce communication load.

Further, the sensor network system 1 according to the first exemplary embodiment of the present invention, with respect to each of parent node candidates, calculates a metric value based on the number of child nodes owned by the parent node candidate and decides a parent node of a processing target node based on the calculated metric value.

According to this, the number of child nodes owned by each of the sensor nodes 201, 202 . . . that are parent node candidates can be reflected on the metric value. Therefore, it is possible to decide a parent node of a processing target node so that the number of child nodes owned by the parent node is close to a value obtained by multiplying the maximum containing number by a natural number. As a result, it is possible to reduce communication load.

Further, in the sensor network system 1 according to the first exemplary embodiment of the present invention, each of the sensor nodes 201, 202 . . . calculates the metric value and decides a parent node of the node itself.

According to this, the sensor nodes 201, 202 . . . each decide parent nodes for the nodes themselves, and thereby, a network topology is formed. That is to say, the sensor nodes 201, 202 . . . autonomously form a network topology. In other words, the sensor network system 1 can form a network topology without a device other than the sensor nodes 201, 202 . . . .

The sensor network system 1 according to a modified example 1 of the first exemplary embodiment is configured to use Formula 4 instead of Formula 2.

$$M_n = \frac{1}{N}\left\{N - \frac{\text{MOD}(n-1, N)}{\text{QUOTIENT}(n-1, N) + 1}\right\}$$ [Formula 4]

Figure 10:
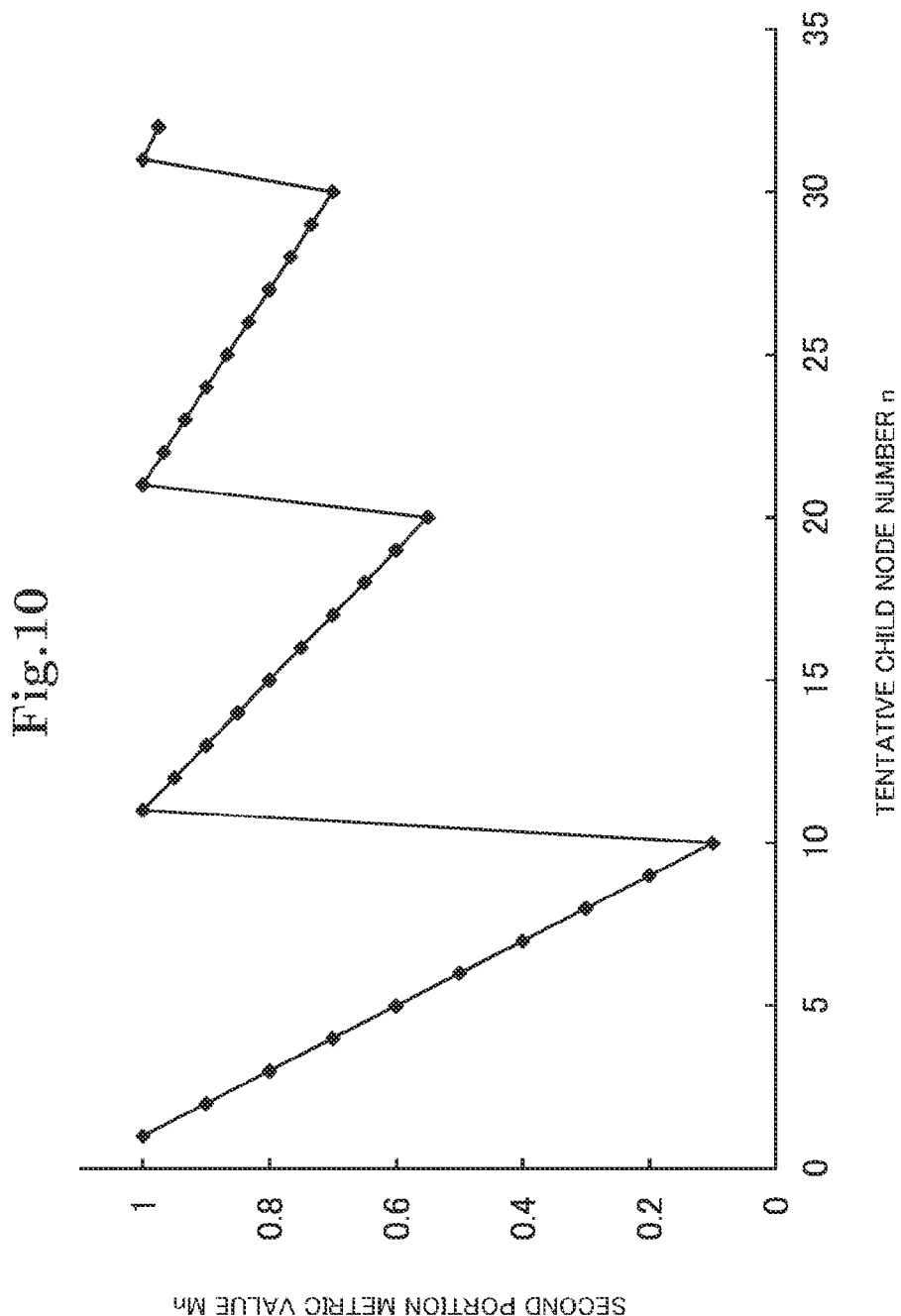
FIG. 10 is a graph showing change of a second portion metric value with respect to a tentative child node number according to a modified example 1 of the first exemplary embodiment of the present invention.

FIG. 10 is a graph showing change of the second portion metric value $M_n(n)$ shown in Formula 4 with respect to the tentative child number n. Herein, a case where the maximum containing number N is 10 is assumed.

As shown in FIG. 10, the second portion metric value $M_n(n)$ decreases as the tentative child node number n increases in a range from a value obtained by adding 1 to a value obtained by multiplying a value obtained by subtracting 1 from a natural number by the maximum containing number N, to a value obtained by multiplying the natural number by the maximum containing number N.

Further, the second portion metric value $M_n(n)$ is a value that the minimum value in a second range from a value obtained by adding 1 to the maximum containing number to a value obtained by multiplying the maximum containing number by 2 (i.e., the second portion metric value $M_n$ when the tentative child node number n is 20) is larger than the minimum value in a first range from 1 to the maximum containing number (i.e., the second portion metric value $M_n$ when the tentative child node number n is 10).

Besides, the second portion metric value $M_n(n)$ is a value that the minimum value in a third range from a value obtained by adding 1 to the value obtained by multiplying the maximum containing number by 2 to a value obtained by multiplying the maximum containing number by 3 (i.e., the second portion metric value $M_n$ when the tentative child node number n is 30) is larger than the minimum value in the second range (i.e., the second portion metric value $M_n$ when the tentative child node number n is 20).

Thus, the metric value is a value that the minimum value in a range from a value obtained by adding 1 to a value obtained by multiplying the maximum containing number by a value obtained by subtracting 1 from a natural number, to a value obtained by multiplying the maximum containing number by the natural number becomes larger as the natural number becomes larger.

Thus, it is possible to make the number of child nodes owned by each of the sensor nodes 201, 202 . . . close to the maximum containing number. That is to say, it is possible to avoid that the number of child nodes owned by each of the sensor nodes 201, 202 . . . becomes excessively large.

Consequently, it is possible to increase the number of sensor nodes that, when receiving pre-aggregation packets from the respective child nodes, transmit only one post-aggregation packet to the parent nodes. As a result, it is possible to further reduce communication load.

Further, the sensor network system 1 according to a modified example 2 of the first exemplary embodiment is configured to use Formula 5 instead of Formula 2.

$$M_n = 1 - \frac{2\text{MOD}(n-1, N)}{N}\sqrt{1 - \left\{\frac{\text{MOD}(n-1, N)}{N}\right\}^2}$$ [Formula 5]

Figure 11:
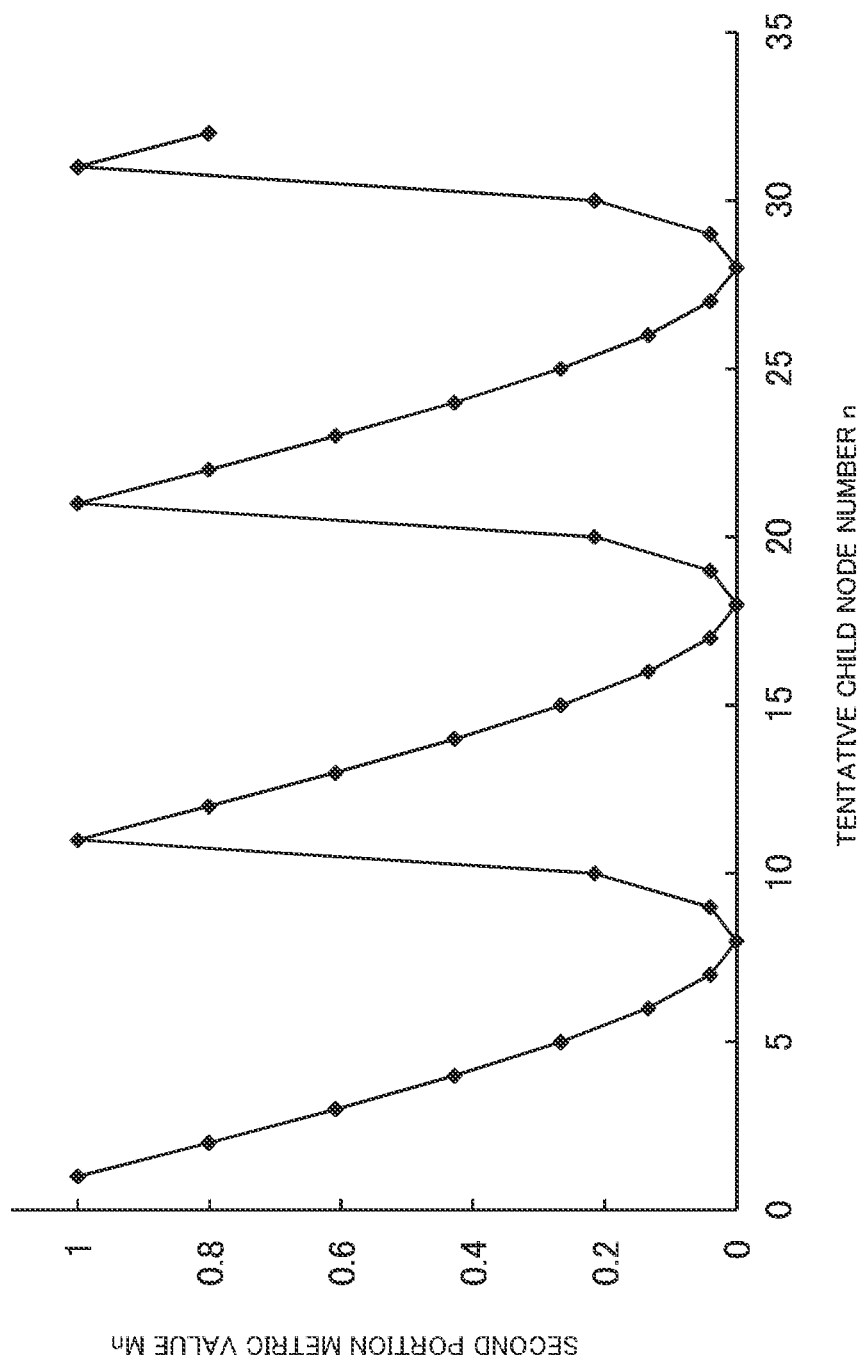
FIG. 11 is a graph showing change of a second portion metric value with respect to a tentative child node number according to a modified example 2 of the first exemplary embodiment of the present invention.

FIG. 11 is a graph showing change of the second portion metric value $M_n(n)$ shown in FIG. 5 with respect to the tentative child node number n. Herein, a case where the maximum containing number N is 10 is assumed.

As shown in FIG. 11, the second portion metric value $M_n(n)$ has the minimum value when, in a range from a lower limit value that is a value obtained by adding 1 to a value obtained by multiplying a value obtained by subtracting 1 from a natural number by the maximum containing number N to an upper bound value that is a value obtained by multiplying the natural number by the maximum containing number N, the tentative child node number n is a value closer to the upper bound value than to the lower bound value.

For example, the second portion metric value $M_n(n)$ has the minimum value when, in a rage from a lower bound value 1 to an upper bound value 10, the tentative child node number n is 8, which is a value closer to the upper bound value than to the lower bound value. Likewise, the second portion metric value $M_n(n)$ has the minimum value when, in a range from a lower bound value 11 to an upper bound value 20, the tentative child node number n is 18, which is a value closer to the upper bound value than to the lower bound value.

Also with this configuration, it is possible to make the number of child nodes owned by each of the nodes close to a value obtained by multiplying the maximum containing number by a natural number.

Further, the sensor network system 1 according to a modified example 3 of the first exemplary embodiment is configured to use Formula 6 instead of Formula 2.

$$M_n = 1 - \frac{2\text{MOD}(n-1, N)}{N\{\text{QUOTIENT}(n-1, N)+1\}}\sqrt{1 - \left\{\frac{\text{MOD}(n-1, N)}{N}\right\}^2}$$ [Formula 6]

Figure 12:
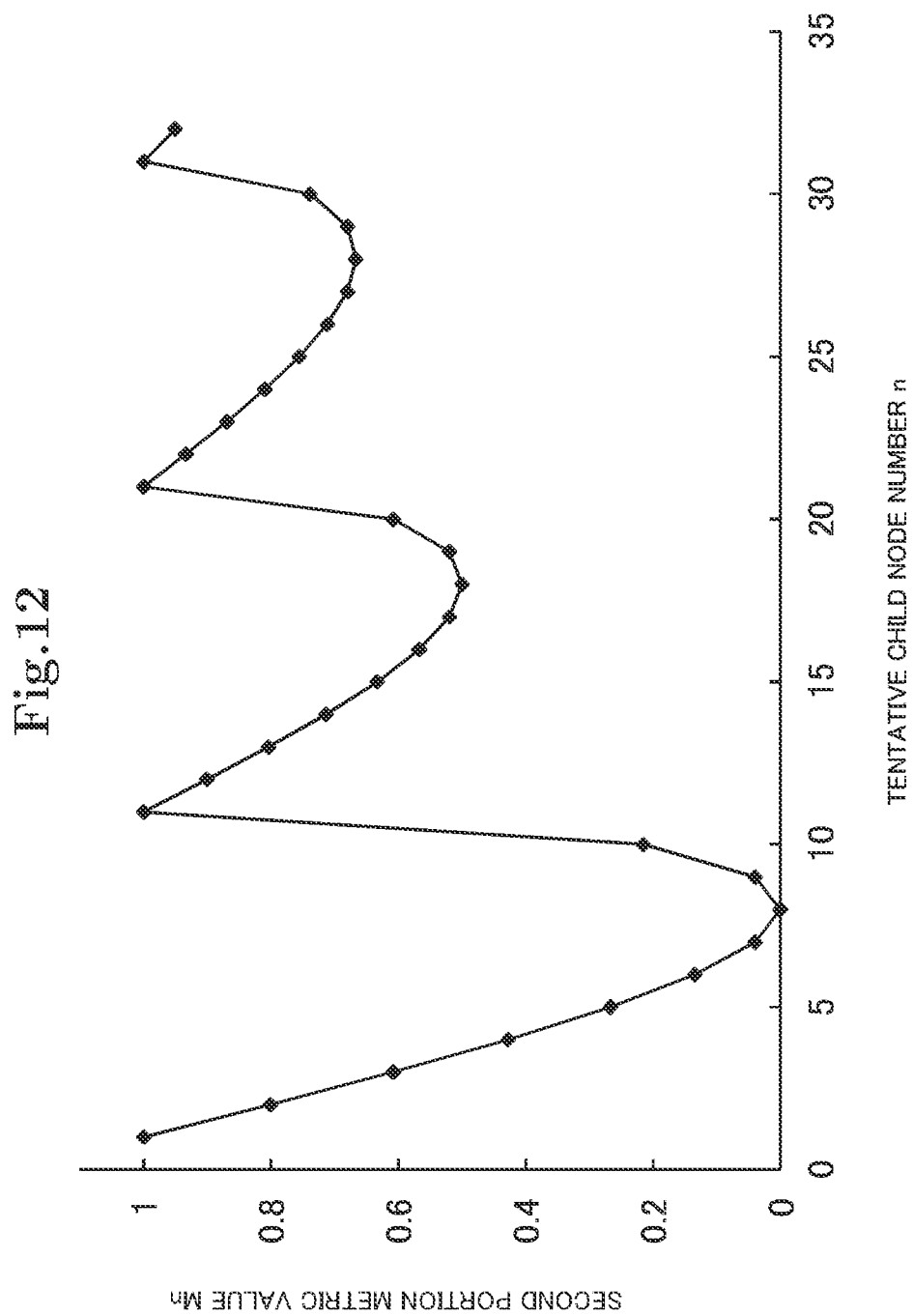
FIG. 12 is a graph showing change of a second portion metric value with respect to a tentative child node number according to a modified example 3 of the first exemplary embodiment of the present invention.

As shown in FIG. 12, the second portion metric value $M_n(n)$ has the minimum value when, in a range from a lower bound value that is a value obtained by adding 1 to a value obtained by multiplying a value obtained by subtracting 1 from a natural number by the maximum containing number N to an upper bound value that is a value obtained by multiplying the natural number by the maximum containing number N, the tentative child node number n is a value closer to the upper bound value than to the lower bound value.

Further, the second portion metric value $M_n(n)$ is a value that the minimum value in a second range from a value obtained by adding 1 to the maximum containing number to a value obtained by multiplying the maximum containing number by 2 (i.e., the second portion metric value $M_n$ when the tentative child node number n is 18) is larger than the minimum value in a first range from 1 to the maximum containing number (i.e., the second portion metric value $M_n(n)$ when the tentative child node number n is 8).

Besides, the second portion metric value $M_n(n)$ is a value that the minimum value in a third range from a value obtained by adding 1 to the value obtained by multiplying the maximum containing number by 2 to a value obtained by multiplying the maximum containing number by 3 (i.e., the second portion metric value $M_n$ when the tentative child node number n is 28) is larger than the minimum value in the second range (i.e., the second portion metric value $M_n$ when the tentative child node number n is 18).

Thus, the metric value is a value that the minimum value in a range from a value obtained by adding 1 to a value obtained by multiplying the maximum containing number by a value obtained by subtracting 1 from a natural number, to a value obtained by multiplying the maximum containing number by the natural number becomes larger as the natural number becomes larger.

According to this, it is possible to make the number of child nodes owned by each of the sensor nodes 201, 202 . . . close to the maximum containing number. That is to say, it is possible to avoid that the number of child nodes owned by each of the sensor nodes 201, 202 . . . becomes excessively large.

Consequently, it is possible to increase the number of sensor nodes that transmit only one post-aggregation packet to the parent node when receiving pre-aggregation packets from the respective child nodes. As a result, it is possible to further reduce communication cost.

The sensor network system 1 according to the first exemplary embodiment is configured so that each of the sensor nodes 201, 202 . . . decides a parent node of the node itself. However, the sensor network system 1 according to another modified example of the first exemplary embodiment may be configured so that a management device (e.g., the sink node 101 or another device) other than the sensor nodes 201, 202 . . . decides a parent node for each of the sensor nodes 201, 202 . . . .

Second Exemplary Embodiment

Next, a sensor network system according to a second exemplary embodiment of the present invention will be described. The sensor network system according to the second exemplary embodiment is different from the sensor network system according to the first exemplary embodiment in calculating a metric value also based on head node density. Head node density is the ratio of the number of sensor nodes having a child node among sensor nodes capable of communicating with parent node candidates to the number of the sensor nodes capable of communicating with the parent node candidates. Below, a description will be made by focusing on the different point.

In this exemplary embodiment, own node information further includes a peripheral node number and a peripheral head node number. The peripheral node number is the number of nodes capable of communicating with the own node. The peripheral head node number is the number of nodes having at least one child node among the nodes capable of communicating with the own node.

Therefore, each of the sensor nodes 201, 202 . . . acquires peripheral node information including the peripheral node number and the peripheral head node number, with respect to each of peripheral nodes (parent node candidates) capable of communicating with the node itself.

Further, the metric value calculating part 322 calculates the metric value M by using Formula 7 instead of Formula 1.

$$M = M_{eh}(e,h) + \alpha \cdot M_n(n) + \beta \cdot M_c(m,c) \quad \text{[Formula 7]}$$

In the above formula, $\beta$ represents a preset coefficient. A third portion metric value $M_c(m,c)$ is a function having a value changing depending on a peripheral node number m and a peripheral head node number c.

In this exemplary embodiment, the third portion metric value $M_c(m,c)$ is expressed by Formula 8.

$$M_c = \frac{c}{m} \quad \text{[Formula 8]}$$

It can be said that the third portion metric value $M_c(m,c)$ is head node density representing the ratio of the peripheral header node number c, which is the number of sensor nodes having a child node among sensor nodes capable of communicating with a parent node candidate on which calculation of the metric value M is executed, to the peripheral head node number m, which is the number of sensor nodes capable of communicating with the parent node candidate.

According to Formula 7, by changing the magnitude of the coefficient $\beta$, it is possible to regulate the degree of reflection of the magnitude of head node density on the metric value M. As the coefficient $\beta$ is made to be close to 0, the degree of reflection of the magnitude of head node density on the metric value M becomes smaller.

The communication quantity of a head node, which is a sensor node with a child node, is more than the communication quantity of a non-head node, which is a sensor node without a child node. Therefore, in a case where sensor nodes with child nodes are distributed in an excessively concentrated state, there is a fear that the communication quality deteriorates due to interference of radio signals.

On the other hand, the sensor network system 1 according to the second exemplary embodiment makes it possible to avoid that the sensor nodes 201, 202 . . . having child nodes are distributed in an excessively concentrated state. As a result, it is possible to avoid deterioration of the communication quality.

Third Exemplary Embodiment

Next, a sensor network system according to a third exemplary embodiment of the present invention will be described. The sensor network system according to the third exemplary embodiment is different from the sensor network system according to the first exemplary embodiment in using a plurality of different network topologies for each size of a plurality of different sensor data. Below, a description will be made focusing on the different point.

The sensor data acquiring part 341 acquires a plurality of sensor data having different sizes. In this exemplary embodiment, the plurality of sensor data represent physical quantities detected during a plurality of different periods (e.g., temperature detected for 30 minutes, temperature detected for 10 days, temperature detected for 30 days, etc.), respectively. In a case where the sensor part 330 is configured to detect a plurality of different physical quantities (e.g., temperature, humidity, electricity consumption, and so on), the plurality of sensor data may represent a plurality of different physical quantities, respectively.

The packet transmitting part 342 generates, for each of a plurality of sensor data having different sizes, a pre-aggregation packet containing the sensor data.

The sensor network system 1 forms a network topology for each size of the plurality of sensor data.

To be specific, each of the nodes (the sensor nodes 201, 202 . . . ) transmits a peripheral search message including size specification information for specifying the size of sensor data. Moreover, each of the nodes transmits a peripheral search response message that includes size specification information included in a received peripheral search message and that is for responding to the peripheral search message.

Besides, each of the nodes calculates a metric value based on the size of the sensor data specified by the size specification information included in the received peripheral search response message and based on peripheral node information acquired based on the received peripheral search response message.

Further, each of the nodes stores size specification information and a routing table so as to be associated with each other. Then, each of the nodes updates a routing table stored in association with the size specification information included in a received peripheral search response message, by using peripheral node information acquired based on the peripheral search response message and a metric value calculated based on the peripheral node information.

Further, each of the nodes acquires the size of sensor data contained in a packet when transmitting the packet. Then, each of the nodes specifies a parent node based on topology information stored in association with size specification information for specifying the acquired size, and transmits the packet to the specified parent node.

The sensor network system 1 may be configured to, before starting transmission of a packet containing sensor data, notice size specification information for specifying the size of sensor data to be contained into the packet, to each of the nodes. In this case, it is preferred that each of the nodes specifies a parent node based on topology information stored in association with the noticed size specification information.

Thus, by using a network topology represented by stored topology information, the sensor network system 1 transmits a packet containing sensor data having a size specified by size specification information stored in association with the topology information.

As described above, the sensor network system 1 according to the third exemplary embodiment of the present invention makes it possible to, for each sensor data, use a network topology suitable for the sensor data and transmit a packet containing the sensor data. As a result, it is possible to reduce communication load. Moreover, it is possible to decrease processing load for forming a network topology as compared with a case of reforming a network topology every time the size of sensor data changes.

The sensor network system 1 according to a modified example of the third exemplary embodiment of the present invention may be configured to use information for specifying the maximum containing number, instead of size specification information. In this case, even if each of the sensor nodes 201, 202 . . . is configured to transmit packets having a plurality of different maximum packet lengths as packets containing sensor data, it is possible to produce the abovementioned actions and effects. Likewise, even if each of the sensor nodes 201, 202 . . . is configured to transmit packets having a plurality of different header lengths as packets containing sensor data, it is possible to produce the abovementioned actions and effects.

Fourth Exemplary Embodiment

Figure 13:
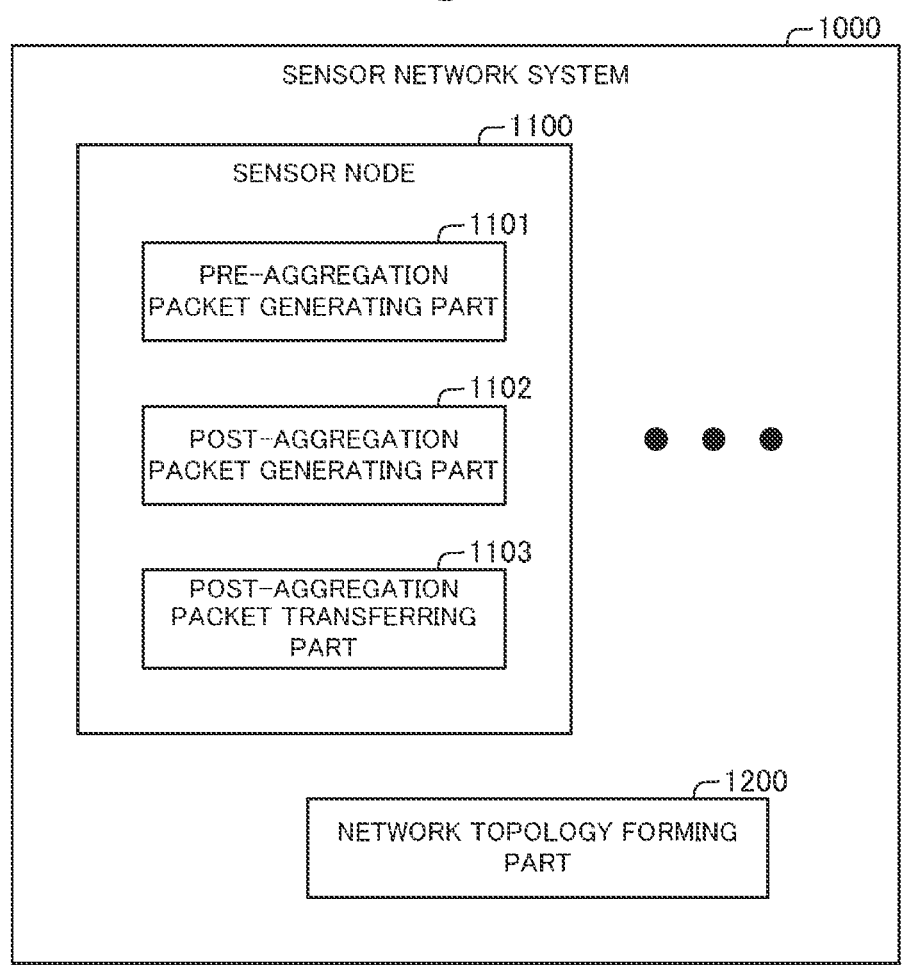
FIG. 13 is a block diagram showing a sensor network system according to a fourth exemplary embodiment of the present invention.

Next, referring to FIG. 13, a sensor network system according to a fourth exemplary embodiment of the present invention will be described.

A sensor network system 1000 according to the fourth exemplary embodiment is a system provided with a plurality of sensor nodes 1100 . . . and configured to decide a parent node for each of the plurality of sensor nodes 1100 . . . so as to form a network topology having a tree structure using each of the plurality of sensor nodes 1100 . . . as a node.

Moreover, each sensor node of the plurality of sensor nodes 1100 . . . comprises:

a pre-aggregation packet generating part (a pre-aggregation packet generating means) 1101 for detecting a physical quantity, generating a pre-aggregation packet that is a packet containing sensor data representing the detected physical quantity, and transmitting the generated pre-aggregation packet to a parent node of the sensor node;

a post-aggregation packet generating part (a post-aggregation packet generating means) 1102 for receiving pre-aggregation packets transmitted by respective child nodes owned by the sensor node, generating a post-aggregation packet that is a packet containing sensor data contained in the respective received pre-aggregation packets, and transmitting the generated post-aggregation packet to the parent node of the sensor node; and a post-aggregation packet transferring part (a post-aggregation packet transferring means) 1103 for receiving the post-aggregation packet transmitted by each of the child nodes owned by the sensor node, and transmitting the received post-aggregation packet to the parent node of the sensor node.

Besides, the sensor network system 1000 comprises a network topology forming part (a network topology forming means) 1200 for forming the network topology so that, with respect to each sensor node of the plurality of sensor nodes 1100 . . . , a number of child nodes owned by the sensor node 1100 is close to a value obtained by multiplying a maximum containing number by a natural number, the maximum containing number being a maximum number of sensor data that can be contained by one packet.

According to this, it is possible to make the number of sensor data contained in a post-aggregation packet close to the maximum containing number. Consequently, it is possible to reduce the number of post-aggregation packets transmitted by the sensor node 1100 to the parent node in the sensor network system 1000. Therefore, it is possible to reduce communication load.

Although the present invention is described above by referring to the above exemplary embodiments, the present invention is not limited to the exemplary embodiments. The configurations and details of the present invention can be modified in various manners that can be understood by one skilled in the art within the scope of the present invention.

For example, sensor data may include, in addition to information representing a detected physical quantity, at least one among node identification information for identifying a node having detected the physical quantity, position information representing the position of the node (i.e., a position where the physical quantity has been detected), and date-and-time information representing date and time when the physical quantity has been detected.

The functions of the sensor network system 1 in the above exemplary embodiments are realized by hardware such as circuits. However, each of the sensor nodes 201, 202 . . . and the sink node 101 may include a processing device and a storage device that stores a program (software) and may be configured to realize the functions by execution of the program by the processing device. In this case, the program may be stored in a computer-readable recording medium. For example, the recording medium is a portable medium such as a flexible disk, an optical disk, a magneto-optical disk and a semiconductor memory.

Further, as another modified example of the exemplary embodiments, any combination of the above exemplary embodiments and modified examples may be employed.

<Supplementary Notes>

The whole or part of the exemplary embodiments disclosed above can be described as, but not limited to, the following supplementary notes.

(Supplementary Note 1)

A sensor network system provided with a plurality of sensor nodes and configured to decide a parent node for each of the plurality of sensor nodes so as to form a network topology having a tree structure using each of the plurality of sensor nodes as a node, wherein each sensor node of the plurality of sensor nodes comprises:

a pre-aggregation packet generating means for detecting a physical quantity, generating a pre-aggregation packet that is a packet containing sensor data representing the detected physical quantity, and transmitting the generated pre-aggregation packet to a parent node of the sensor node;

a post-aggregation packet generating means for receiving pre-aggregation packets transmitted by respective child nodes owned by the sensor node, generating a post-aggregation packet that is a packet containing sensor data contained by the respective received pre-aggregation packets, and transmitting the generated post-aggregation packet to the parent node of the sensor node; and a post-aggregation packet transferring means for receiving the post-aggregation packet transmitted by each of the child nodes owned by the sensor node, and transmitting the received post-aggregation packet to the parent node of the sensor node, the sensor network system comprising a network topology forming means for forming the network topology so that, with respect to each sensor node of the plurality of sensor nodes, a number of child nodes owned by the sensor node is close to a value obtained by multiplying a maximum containing number by a natural number, the maximum containing number being a maximum number of sensor data that can be contained by one packet.

According to this, it is possible to make the number of sensor data contained in a post-aggregation packet close to a maximum containing number. Consequently, it is possible to reduce the number of post-aggregation packets transmitted by a sensor node to a parent node in the sensor network system. Therefore, it is possible to reduce communication load.

(Supplementary Note 2)

The sensor network system according to Supplementary Note 1, wherein the network topology forming means is configured to: specify each of the plurality of sensor nodes as a processing target node; extract parent node candidates that are sensor nodes capable of communicating with the specified processing target node from among the plurality of sensor nodes; with respect to each parent node candidate of the extracted parent node candidates, calculate a metric value based on a number of child nodes owned by the parent node candidate; and decide a parent node of the processing target node based on the calculated metric value from among the extracted parent node candidates.

According to this, it is possible to reflect the number of child nodes owned by a sensor node as a parent node candidate on a metric value. Therefore, it is possible to decide a parent node of a processing target node so as to make the number of child nodes owned by the parent node close to a value obtained by multiplying a maximum containing number by a natural number. As a result, it is possible to reduce communication load.

(Supplementary Note 3)

The sensor network system according to Supplementary Note 2, wherein:

the network topology forming means is configured to determine a parent node candidate that the calculated metric value is minimum as the parent node of the processing target node from among the extracted parent node candidates; and the metric value decreases as a tentative child node number increases in a range from a value obtained by adding 1 to a value obtained by multiplying a value obtained by subtracting 1 from a natural number by the maximum containing number to a value obtained by multiplying the natural number by the maximum containing number, the tentative child node number being a value obtained by adding 1 to a number of child nodes owned by each of the parent node candidates.

(Supplementary Note 4)

The sensor network system according to Supplementary Note 2, wherein:

the network topology forming means is configured to determine a parent node candidate that the calculated metric value is minimum as the parent node of the processing target node from among the extracted parent node candidates; and the metric value has a minimum value when, in a range from a lower bound value that is a value obtained by adding 1 to a value obtained by multiplying a value obtained by subtracting 1 from a natural number by the maximum containing number to an upper bound value that is a value obtained by multiplying the natural number by the maximum containing number, a tentative child node number is a value closer to the upper bound value than to the lower bound value, the tentative child node number being a value obtained by adding 1 to a number of child nodes owned by each of the parent node candidates.

(Supplementary Note 5)

The sensor network system according to Supplementary Note 3 or 4, wherein the metric value is a value that a minimum value in a second range from a value obtained by adding 1 to the maximum containing number to a value obtained by multiplying the maximum containing number by 2 is larger than a minimum value in a first range from 1 to the maximum containing number.

According to this, it is possible to make the number of child nodes owned by each of the sensor nodes close to a maximum containing number. Consequently, it is possible to increase the number of sensor nodes each transmitting only one post-aggregation packet to a parent node, when receiving a pre-aggregation packet from each of the child nodes. As a result, it is possible to further reduce communication load.

(Supplementary Note 6)

The sensor network system according to any of Supplementary Notes 2 to 5, wherein:

the network topology forming means is configured by a parent node deciding means comprised by each sensor node of the plurality of sensor nodes; and the parent node deciding means is configured to: extract parent node candidates that are sensor nodes capable of communicating with the sensor node from among the plurality of sensor nodes; from each parent node candidate of the extracted parent node candidates, receive child node number information representing a number of child nodes owned by the parent node candidate; with respect to each parent node candidate of the extracted parent node candidates, calculate the metric value based on the number of child nodes represented by the received child node number information; and decide a parent node of the sensor node based on the calculated metric value from among the extracted parent node candidates.

According to this, each of the sensor nodes decides a parent node of the own node, and a network topology is thereby formed. That is to say, each of the sensor nodes can autonomously form a network topology. In other words, the sensor network system can form a network topology without being equipped with a device other than the sensor nodes.

(Supplementary Note 7)

The sensor network system according to any of Supplementary Notes 2 to 6, wherein the metric value is a value changing depending on at least one of intensity of a radio signal received from the parent node candidate and a hop count from the parent node candidate to a root node in the tree structure and also depending on a number of child nodes owned by the parent node candidate.

(Supplementary Note 8)

The sensor network system according to any of Supplementary Notes 2 to 7, wherein the metric value is a value changing depending on head node density representing a ratio of a number of sensor nodes having a child node among sensor nodes capable of communicating with the parent node candidate to a number of the sensor nodes capable of communicating with the parent node candidate.

The communication quantity of a head node, which is a sensor node with a child node, is more than the communication quantity of a non-head node, which is a sensor node without a child node. Therefore, in a case where sensor nodes having child nodes are distributed in an excessively concentrated state, there is a fear that the communication quality deteriorates due to interference of radio signals. On the other hand, the above configuration makes it possible to avoid that sensor nodes having child nodes are distributed in an excessively concentrated state. As a result, it is possible to avoid deterioration of the communication quality.

(Supplementary Note 9)

The sensor network system according to any of Supplementary Notes 1 to 8, wherein the pre-aggregation packet generating means is configured to, with respect to each sensor data of a plurality of sensor data having different sizes, generate a pre-aggregation packet containing the sensor data, the sensor network system being configured to:

form a plurality of network topologies with respect to the respective sizes of the plurality of sensor data;

store size specification information for specifying a size of the sensor data, and topology information representing a network topology formed with respect to the size; and use the network topology represented by the stored topology information, thereby transmitting a packet containing the sensor data of the size specified by the size specification information stored in association with the topology information.

According to this, it is possible to, for each sensor data, use a network topology suitable for the sensor data and transmit a packet containing the sensor data. As a result, it is possible to reduce communication load. Moreover, it is possible to decrease processing load for forming a network topology as compared with a case of reforming a network topology every time the size of sensor data changes.

(Supplementary Note 10)

A sensor network control method applied to a sensor network system provided with a plurality of sensor nodes and configured to decide a parent node for each of the plurality of sensor nodes so as to form a network topology having a tree structure using each of the plurality of sensor nodes as a node, the sensor network control method comprising:

by each sensor node of the plurality of sensor nodes, detecting a physical quantity, generating a pre-aggregation packet that is a packet containing sensor data representing the detected physical quantity, and transmitting the generated pre-aggregation packet to a parent node of the sensor node;

by each sensor node of the plurality of sensor nodes, receiving pre-aggregation packets transmitted by respective child nodes owned by the sensor node, generating a post-aggregation packet that is a packet containing sensor data contained by the respective received pre-aggregation packets, and transmitting the generated post-aggregation packet to the parent node of the sensor node;

by each sensor node of the plurality of sensor nodes, receiving the post-aggregation packet transmitted by each of the child nodes owned by the sensor node, and transmitting the received post-aggregation packet to the parent node of the sensor node; and forming the network topology so that, with respect to each sensor node of the plurality of sensor nodes, a number of child nodes owned by the sensor node is close to a value obtained by multiplying a maximum containing number by a natural number, the maximum containing number being a maximum number of sensor data that can be contained by one packet.

(Supplementary Note 11)

The sensor network control method according to Supplementary Note 10, comprising:

specifying each of the plurality of sensor nodes as a processing target node;

extracting parent node candidates that are sensor nodes capable of communicating with the specified processing target node from among the plurality of sensor nodes;

with respect to each parent node candidate of the extracted parent node candidates, calculating a metric value based on a number of child nodes owned by the parent node candidate; and deciding a parent node of the processing target node based on the calculated metric value from among the extracted parent node candidates.

(Supplementary Note 12)

A sensor node forming a node in a network topology having a tree structure, the sensor node comprising:

a pre-aggregation packet generating means for detecting a physical quantity, generating a pre-aggregation packet that is a packet containing sensor data representing the detected physical quantity, and transmitting the generated pre-aggregation packet to a parent node;

a post-aggregation packet generating means for receiving pre-aggregation packets transmitted by respective child nodes, generating a post-aggregation packet that is a packet containing sensor data contained by the respective received pre-aggregation packets, and transmitting the generated post-aggregation packet to the parent node;

a post-aggregation packet transferring means for receiving the post-aggregation packet transmitted by each of the child nodes, and transmitting the received post-aggregation packet to the parent node; and a parent node deciding means for: specifying parent node candidates that are other sensor nodes capable of communicating with the sensor node; with respect to each parent node candidate of the specified parent node candidates, calculating a metric value for making a number of child nodes owned by the parent node candidate close to a value obtained by multiplying a maximum containing number by a natural number, the maximum containing number being a maximum number of sensor data that can be contained by one packet; and deciding a parent node of the sensor node based on the calculated metric value from among the specified parent node candidates.

(Supplementary Note 13)

A sensor node control method applied to a sensor node forming a node in a network topology having a tree structure, the sensor node control method comprising:

detecting a physical quantity, generating a pre-aggregation packet that is a packet containing sensor data representing the detected physical quantity, and transmitting the generated pre-aggregation packet to a parent node;

receiving pre-aggregation packets transmitted by respective child nodes, generating a post-aggregation packet that is a packet containing sensor data contained by the respective received pre-aggregation packets, and transmitting the generated post-aggregation packet to the parent node;

receiving the post-aggregation packet transmitted by each of the child nodes, and transmitting the received post-aggregation packet to the parent node; and specifying parent node candidates that are other sensor nodes capable of communicating with the sensor node; with respect to each parent node candidate of the specified parent node candidates, calculating a metric value for making a number of child nodes owned by the parent node candidate close to a value obtained by multiplying a maximum containing number by a natural number, the maximum containing number being a maximum number of sensor data that can be contained by one packet; and deciding a parent node of the sensor node based on the calculated metric value from among the specified parent node candidates.

(Supplementary Note 14)

A sensor node control program comprising instructions for causing a sensor node forming a node in a network topology having a tree structure to perform operations including:

detecting a physical quantity, generating a pre-aggregation packet that is a packet containing sensor data representing the detected physical quantity, and transmitting the generated pre-aggregation packet to a parent node;

receiving pre-aggregation packets transmitted by respective child nodes, generating a post-aggregation packet that is a packet containing sensor data contained by the respective received pre-aggregation packets, and transmitting the generated post-aggregation packet to the parent node;

receiving the post-aggregation packet transmitted by each of the child nodes, and transmitting the received post-aggregation packet to the parent node; and specifying parent node candidates that are other sensor nodes capable of communicating with the sensor node; with respect to each parent node candidate of the specified parent node candidates, calculating a metric value for making a number of child nodes owned by the parent node candidate close to a value obtained by multiplying a maximum containing number by a natural number, the maximum containing number being a maximum number of sensor data that can be contained by one packet; and deciding a parent node of the sensor node based on the calculated metric value from among the specified parent node candidates.

The present invention is based upon and claims the benefit of priority from Japanese patent application No. 2011-171708, filed on Aug. 5, 2011, the disclosure of which is incorporated herein in its entirety by reference.

INDUSTRIAL APPLICABILITY

The present invention can be applied to a sensor network system including a plurality of sensor nodes, and the like.

DESCRIPTION OF REFERENCE NUMERALS 1 sensor network system
101 sink node
201, 202 . . . sensor node
310 wireless communication part
311 antenna
320 routing function part
321 peripheral node information acquiring part
322 metric value calculating part
323 routing table storing part
324 parent node deciding part
325 own node information transmitting part
330 sensor part
340 application function part
341 sensor data acquiring part
342 packet transmitting part
410 wireless communication part
420 routing function part
430 database part
440 application function part
441 packet receiving part
442 database managing part
1000 sensor network system
1100 . . . sensor node
1101 pre-aggregation packet generating part
1102 post-aggregation packet generating part
1103 post-aggregation packet transferring part
1200 network topology forming part

The invention claimed is:

1. A sensor network system provided with a plurality of sensor nodes and configured to decide a parent node for each of the plurality of sensor nodes so as to form a network topology having a tree structure using each of the plurality of sensor nodes as a node, wherein each sensor node of the plurality of sensor nodes comprises:

a memory storing instructions; and
a processing device configured to execute the instructions to:

detect a physical quantity, generate a pre-aggregation packet that is a packet containing sensor data representing the detected physical quantity, and transmit the generated pre-aggregation packet to the parent node of the sensor node;

receive pre-aggregation packets transmitted by respective child nodes owned by the sensor node, generate a post-aggregation packet containing sensor data contained by the respective received pre-aggregation packets, and transmit the generated post-aggregation packet to the parent node of the sensor node; and receive the post-aggregation packet transmitted by each of the child nodes owned by the sensor node, and transmit the received post-aggregation packet to the parent node of the sensor node, the processing device further configured to execute the instructions to form the network topology, wherein with respect to each sensor node of the plurality of sensor nodes, a number of the child nodes owned by the sensor node is within a first value range of a value obtained by multiplying a first containing number by a natural number, the first containing number being a maximum number of sensor data that one packet is configured to contain.

2. The sensor network system according to claim 1, wherein the processing device is further configured to execute the instructions to:

specify each of the plurality of sensor nodes as a processing target node;

extract parent node candidates that are sensor nodes capable of communicating with the specified processing target node from among the plurality of sensor nodes;

with respect to each parent node candidate of the extracted parent node candidates, calculate a metric value based on a number of child nodes owned by the parent node candidate; and decide a parent node of the processing target node based on the calculated metric value from among the extracted parent node candidates.

3. The sensor network system according to claim 2, wherein:
the processing device is further configured to execute the instructions to determine the parent node of the processing target node from among the extracted parent node candidates as a parent node candidate for which the calculated metric value is a second value; and
the metric value decreases as a tentative child node number increases in a range from a third value to a fourth, the third value obtained by adding 1 to a fifth value, the fifth value obtained by multiplying a sixth value by the first containing number, the sixth value obtained by subtracting 1 from a natural number, the fourth value obtained by multiplying the natural number by the first containing number, the tentative child node number obtained by adding 1 to the number of child nodes owned by each of the parent node candidates.

4. The sensor network system according to claim 2, wherein:
the processing device is further configured to execute the instructions to determine the parent node of the processing target node from among the extracted parent node candidates as a parent node candidate for which the calculated metric value is a seventh value; and
the metric value has an eighth value when, in a range from a lower bound value to an upper bound value, a tentative child node number is within a second value range of the upper bound value, the second value range being smaller than a third value range of the lower bound value, wherein
the lower bound value is obtained by adding 1 to a ninth value, the ninth value obtained by multiplying a tenth value by the first containing number, the tenth value obtained by subtracting 1 from a natural number, and
the upper bound value is obtained by multiplying the natural number by the first containing number, and
the tentative child node number is obtained by adding 1 to the number of child nodes owned by each of the parent node candidates.

5. The sensor network system according to claim 3, wherein the metric value is a value where an eleventh value in a range from a twelfth value to a thirteenth value is larger than a fourteenth value in a range from 1 to the first containing number, the twelfth value obtained by adding 1 to the first containing number, the thirteenth value obtained by multiplying the first containing number by 2.

6. The sensor network system according to claim 2, wherein:
the processing device is further configured to execute instructions to:
extract parent node candidates that are sensor nodes capable of communicating with the sensor node from among the plurality of sensor nodes;
from each parent node candidate of the extracted parent node candidates, receive child node number information representing a number of child nodes owned by the parent node candidate;
with respect to each parent node candidate of the extracted parent node candidates, calculate the metric value based on the number of child nodes represented by the received child node number information; and decide a parent node of the sensor node based on the calculated metric value from among the extracted parent node candidates.

7. The sensor network system according to claim 2, wherein the metric value changes depending on at least one of an intensity of a radio signal received from a parent node candidate, a hop count from a parent node candidate to a root node in the tree structure, and a number of child nodes owned by a parent node candidate.

8. The sensor network system according to claim 2, wherein the metric value changes depending on a head node density that represents a ratio of a number of sensor nodes having a child node configured to communicate with a parent node candidate to a number of the sensor nodes configured to communicate with a parent node candidate.

9. The sensor network system according to claim 1, wherein the sensor data has a size, and
the sensor network system is configured to:
form a plurality of network topologies with respect to the size of the sensor data;
store size specification information for specifying the size of the sensor data, and topology information representing a network topology formed with respect to the size; and
use the network topology to transmit a packet containing the sensor data of the size specified by the size specification information.

10. A sensor network control method applied to a sensor network system provided with a plurality of sensor nodes and configured to decide a parent node for each of the plurality of sensor nodes so as to form a network topology having a tree structure using each of the plurality of sensor nodes as a node, the sensor network control method comprising:
detecting a physical quantity, generating a pre-aggregation packet that is a packet containing sensor data representing the detected physical quantity, and transmitting the generated pre-aggregation packet to the parent node of the sensor node;
receiving pre-aggregation packets transmitted by respective child nodes owned by the sensor node, generating a post-aggregation packet containing sensor data contained by the respective received pre-aggregation packets, and transmitting the generated post-aggregation packet to the parent node of the sensor node;
receiving the post-aggregation packet transmitted by each of the child nodes owned by the sensor node, and transmitting the received post-aggregation packet to the parent node of the sensor node; and
forming the network topology wherein with respect to each sensor node of the plurality of sensor nodes, a number of the child nodes owned by the sensor node is within a value range of a value obtained by multiplying a first containing number by a natural number, the first containing number being a maximum number of sensor data that one packet is configured to contain.

11. The sensor network control method according to claim 10, comprising:
specifying each of the plurality of sensor nodes as a processing target node;
extracting parent node candidates that are sensor nodes capable of communicating with the specified processing target node from among the plurality of sensor nodes;
with respect to each parent node candidate of the extracted parent node candidates, calculating a metric value based on a number of child nodes owned by the parent node candidate; and deciding a parent node of the processing target node based on the calculated metric value from among the extracted parent node candidates.

12. A sensor node forming a node in a network topology having a tree structure, the sensor node comprising:
a memory storing instructions; and
a processing device configured to execute the instructions to:
detect a physical quantity, generate a pre-aggregation packet that is a packet containing sensor data representing the detected physical quantity, and transmit the generated pre-aggregation packet to a parent node;
receive pre-aggregation packets transmitted by respective child nodes, generate a post-aggregation packet that is a packet containing sensor data contained by the respective received pre-aggregation packets, and transmit the generated post-aggregation packet to the parent node;
receive the post-aggregation packet transmitted by each of the child nodes, and transmit the received post-aggregation packet to the parent node; and
specify parent node candidates that are other sensor nodes capable of communicating with the sensor node;
with respect to each parent node candidate of the specified parent node candidates, calculate a metric value for making a number of child nodes owned by the parent node candidate within a value range of a value obtained by multiplying a first containing number by a natural number, the first containing number being a maximum number of sensor data that one packet is configured to contain; and decide the parent node based on the calculated metric value from among the specified parent node candidates.

13. A sensor node control method applied to a sensor node forming a node in a network topology having a tree structure, the sensor node control method comprising:
detecting a physical quantity, generating a pre-aggregation packet that is a packet containing sensor data representing the detected physical quantity, and transmitting the generated pre-aggregation packet to a parent node;
receiving pre-aggregation packets transmitted by respective child nodes, generating a post-aggregation packet that is a packet containing sensor data contained by the respective received pre-aggregation packets, and transmitting the generated post-aggregation packet to the parent node;
receiving the post-aggregation packet transmitted by each of the child nodes, and transmitting the received post-aggregation packet to the parent node; and
specifying parent node candidates that are other sensor nodes capable of communicating with the sensor node;
with respect to each parent node candidate of the specified parent node candidates, calculating a metric value for making a number of child nodes owned by the parent node candidate within a value range of a value obtained by multiplying a first containing number by a natural number, the first containing number being a maximum number of sensor data that one packet is configured to contain; and deciding the parent node based on the calculated metric value from among the specified parent node candidates.

14. A non-transitory computer-readable medium storing a sensor node control program executed by a processing device, the program comprising instructions for causing a sensor node forming a node in a network topology having a tree structure to perform operations including:
detecting a physical quantity, generating a pre-aggregation packet that is a packet containing sensor data representing the detected physical quantity, and transmitting the generated pre-aggregation packet to a parent node;
receiving pre-aggregation packets transmitted by respective child nodes, generating a post-aggregation packet that is a packet containing sensor data contained by the respective received pre-aggregation packets, and transmitting the generated post-aggregation packet to the parent node;
receiving the post-aggregation packet transmitted by each of the child nodes, and transmitting the received post-aggregation packet to the parent node; and
specifying parent node candidates that are other sensor nodes capable of communicating with the sensor node;
with respect to each parent node candidate of the specified parent node candidates, calculating a metric value for making a number of child nodes owned by the parent node candidate within a value range of a value obtained by multiplying a first containing number by a natural number, the first containing number being a maximum number of sensor data that one packet is configured to contain; and deciding the parent node based on the calculated metric value from among the specified parent node candidates.

* * * * *